(12) United States Patent  
Yoshida et al.

(10) Patent No.: US 9,303,722 B2  
(45) Date of Patent: Apr. 5, 2016

(54) FRICTION TRANSMISSION BELT AND METHOD FOR MANUFACTURING THE SAME

(71) Applicant: BANDO CHEMICAL INDUSTRIES, LTD., Kobe-shi (JP)

(72) Inventors: Keisuke Yoshida, Kobe (JP); Sungjin Kim, Kobe (JP)

(73) Assignee: BANDO CHEMICAL INDUSTRIES, LTD., Kobe-Shi (JP)

(*) Notice: Subject to any disclaimer, the term of this patent is extended or adjusted under 35 U.S.C. 154(b) by 0 days.

(21) Appl. No.: 14/304,782

(22) Filed: Jun. 13, 2014

(65) Prior Publication Data

US 2014/0296011 A1  Oct. 2, 2014

Related U.S. Application Data

(63) Continuation of application No. PCT/JP2012/007957, filed on Dec. 12, 2012.

(30) Foreign Application Priority Data

Dec. 14, 2011  (JP) .................. 2011-273553

(51) Int. Cl.

| F16G 1/00 | (2006.01) |
|---|---|
| F16G 5/00 | (2006.01) |
| F16G 9/00 | (2006.01) |
| F16G 1/04 | (2006.01) |
| F16G 5/14 | (2006.01) |
| B29D 29/10 | (2006.01) |
| F16G 5/20 | (2006.01) |
| F16G 5/08 | (2006.01) |
| F16H 9/04 | (2006.01) |

(52) U.S. Cl.  
CPC ............... *F16G 5/14* (2013.01); *B29D 29/103* (2013.01); *F16G 5/08* (2013.01); *F16G 5/20* (2013.01); *F16H 9/04* (2013.01)

(58) Field of Classification Search  
CPC ..... C08L 23/16; C08L 2666/08; C08L 21/00; F16G 5/20; F16G 5/06  
USPC .......................................... 474/237, 264, 268  
See application file for complete search history.

(56) References Cited

U.S. PATENT DOCUMENTS

| 3,790,403 | A | * | 2/1974 | Ribbans, III ................ 442/180 |
| 3,964,328 | A | | 6/1976 | Redmond, Jr. |
| 3,989,868 | A | * | 11/1976 | Bell et al. ...................... 428/161 |
| 4,699,832 | A | * | 10/1987 | Sattelmeyer ................. 428/36.8 |
| 4,747,812 | A | * | 5/1988 | Matsuoka et al. ............ 474/252 |
| 4,772,253 | A | * | 9/1988 | Koizumi et al. ............. 474/266 |
| 4,892,510 | A | * | 1/1990 | Matsuoka et al. ............ 474/252 |

(Continued)

FOREIGN PATENT DOCUMENTS

| CN | 1540183 A | 10/2004 |
| CN | 1540184 A | 10/2004 |

(Continued)

*Primary Examiner* — Henry Liu  
(74) *Attorney, Agent, or Firm* — Knobbe Martens Olson & Bear LLP

(57) ABSTRACT

A friction transmission belt includes a belt body made of a rubber composition and wrapped around pulleys to transmit power. A thermoplastic resin film(s) adheres to a pulley contact-side surface of the belt body, and friction coefficient reduction powder particles dispersively adhere to the pulley contact-side surface of the belt body.

15 Claims, 16 Drawing Sheets

(56) References Cited

U.S. PATENT DOCUMENTS

| | | | |
|---|---|---|---|
| 5,066,344 A * | 11/1991 | Inami et al. | 156/138 |
| 5,224,905 A * | 7/1993 | Mishima | 474/258 |
| 5,819,140 A * | 10/1998 | Iseki et al. | 399/165 |
| 6,465,074 B1 * | 10/2002 | FitzPatrick et al. | 428/131 |
| 6,918,849 B2 * | 7/2005 | Gregg et al. | 474/263 |
| 6,993,270 B2 * | 1/2006 | Yoshioka et al. | 399/162 |
| 7,695,386 B2 * | 4/2010 | Wood et al. | 474/271 |
| 7,780,561 B2 * | 8/2010 | Nosaka et al. | 474/260 |
| 8,192,317 B2 * | 6/2012 | Lee et al. | 474/267 |
| 8,475,310 B2 * | 7/2013 | Shiriike et al. | 474/238 |
| 2001/0044353 A1 * | 11/2001 | Nosaka et al. | 474/260 |
| 2004/0214674 A1 * | 10/2004 | Tachibana et al. | 474/237 |
| 2004/0214676 A1 * | 10/2004 | Shiriike et al. | 474/260 |
| 2005/0093205 A1 | 5/2005 | Martin et al. | |
| 2005/0113200 A1 * | 5/2005 | Okuno et al. | 474/266 |
| 2006/0046885 A1 * | 3/2006 | Hara et al. | 474/237 |
| 2006/0234820 A1 * | 10/2006 | Yamamoto et al. | 474/266 |
| 2006/0287148 A1 * | 12/2006 | Wood et al. | 474/260 |
| 2007/0105677 A1 * | 5/2007 | Takayama et al. | 474/237 |
| 2008/0004145 A1 * | 1/2008 | Duke et al. | 474/205 |
| 2008/0135199 A1 * | 6/2008 | Rouhling | 162/296 |
| 2008/0207371 A1 * | 8/2008 | Dieudonne et al. | 474/263 |
| 2008/0261739 A1 * | 10/2008 | Kanzow et al. | 474/266 |
| 2009/0048048 A1 * | 2/2009 | Nakamura et al. | 474/263 |
| 2009/0069138 A1 * | 3/2009 | Takai et al. | 474/254 |
| 2010/0069190 A1 * | 3/2010 | Yoshida | 474/265 |
| 2010/0075793 A1 * | 3/2010 | Cretin et al. | 474/205 |
| 2010/0267506 A1 * | 10/2010 | Murase et al. | 474/263 |
| 2010/0298079 A1 * | 11/2010 | Shiriike et al. | 474/238 |
| 2012/0021858 A1 * | 1/2012 | Matsuda et al. | 474/237 |
| 2012/0021860 A1 * | 1/2012 | Matsuda | 474/260 |
| 2012/0058849 A1 * | 3/2012 | Yoshida | 474/148 |
| 2014/0296011 A1 * | 10/2014 | Yoshida et al. | 474/261 |
| 2014/0323256 A1 * | 10/2014 | Yoshida | 474/148 |

FOREIGN PATENT DOCUMENTS

| | | |
|---|---|---|
| CN | 101076679 A | 12/2007 |
| JP | 2003-127245 A | 5/2003 |
| JP | 2007-170587 A | 7/2007 |
| JP | 2009-526954 A | 7/2009 |
| JP | 2009-533606 A | 9/2009 |
| JP | 2010-53935 A | 3/2010 |
| JP | 2010-101489 A | 5/2010 |
| JP | 2010-242825 A | 10/2010 |
| WO | 2010/134289 A | 11/2010 |

* cited by examiner

FRICTION TRANSMISSION BELT AND METHOD FOR MANUFACTURING THE SAME

CROSS-REFERENCE TO RELATED APPLICATIONS

This is a continuation of International Application No. PCT/JP2012/007957 filed on Dec. 12, 2012, which claims priority to Japanese Patent Application No. 2011-273553 filed on Dec. 14, 2011. The entire disclosures of these applications are incorporated by reference herein.

BACKGROUND

The present disclosure relates to a friction transmission belt and the method for manufacturing the friction transmission belt.

For friction transmission belts such as V-ribbed belts, there is a demand to reduce noise generated upon contact with pulleys.

Concerning such demand for noise reduction, Japanese Translation of PCT International Application No. 2009-533606 discloses a V-ribbed belt configured such that V-rib surfaces are covered with a thermoplastic resin film containing fluorine particles. Japanese Translation of PCT International Application No. 2009-526954 discloses a V-ribbed belt configured such that V-rib surfaces are covered with a knitted fabric and that noise and friction reduction coating is, using polyurethane containing a fluorine-containing polymer, applied to a surface of the knitted fabric.

SUMMARY

One aspect of the present disclosure is intended for a friction transmission belt including a belt body made of a rubber composition and wrapped around pulleys to transmit power. A thermoplastic resin film adheres to a pulley contact-side surface of the belt body, and friction coefficient reduction powder particles dispersively adhere to the pulley contact-side surface of the belt body.

Another aspect of the present disclosure is intended for a friction transmission belt including a belt body made of a rubber composition and wrapped around pulleys to transmit power. The friction transmission belt is manufactured by spraying, in advance, thermoplastic resin powder particles and friction coefficient reduction powder particles to a molding surface of a belt mold assembly for forming a pulley contact-side part of the friction transmission belt to form a powder layer, and compressing a non-crosslinked rubber composition for belt formation against the powder layer to crosslink the non-crosslinked rubber composition at a molding temperature at which the thermoplastic resin powder particles are melted and at which the friction coefficient reduction powder particles are unmelted.

Still another aspect of the present disclosure is intended for a method for manufacturing the friction transmission belt, which includes spraying, in advance, thermoplastic resin powder particles and friction coefficient reduction powder particles to a molding surface of a belt mold assembly for forming a pulley contact-side part of the friction transmission belt to form a powder layer, and compressing a non-crosslinked rubber composition for belt formation against the powder layer to crosslink the non-crosslinked rubber composition at a molding temperature at which the thermoplastic resin powder particles are melted and at which the friction coefficient reduction powder particles are unmelted.

DETAILED DESCRIPTION

Embodiments will be described below in detail with reference to drawings.

(First Embodiment)

Figure 1:
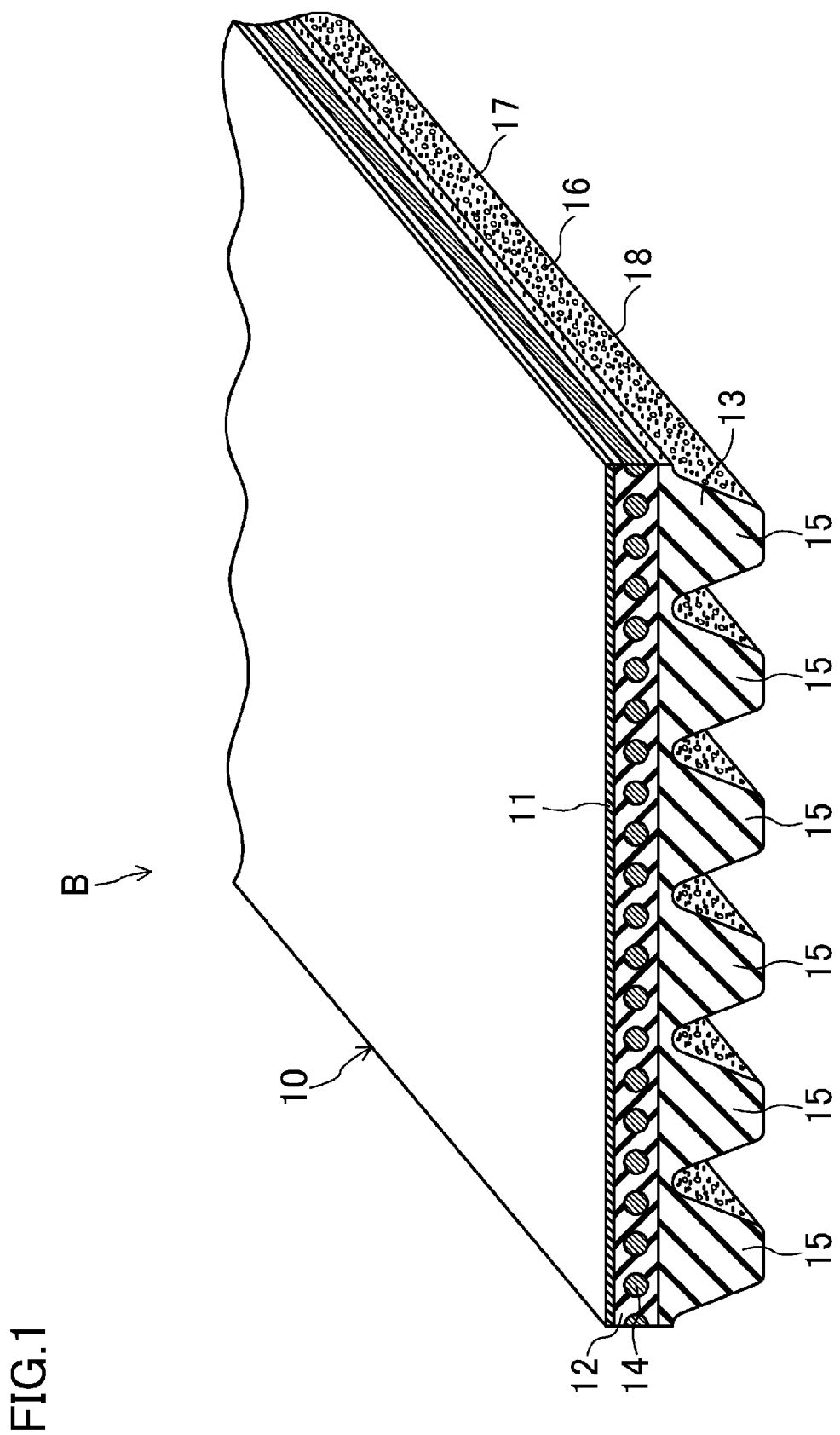
FIG. 1 is a perspective view of a V-ribbed belt of a first embodiment.
Figure 2:
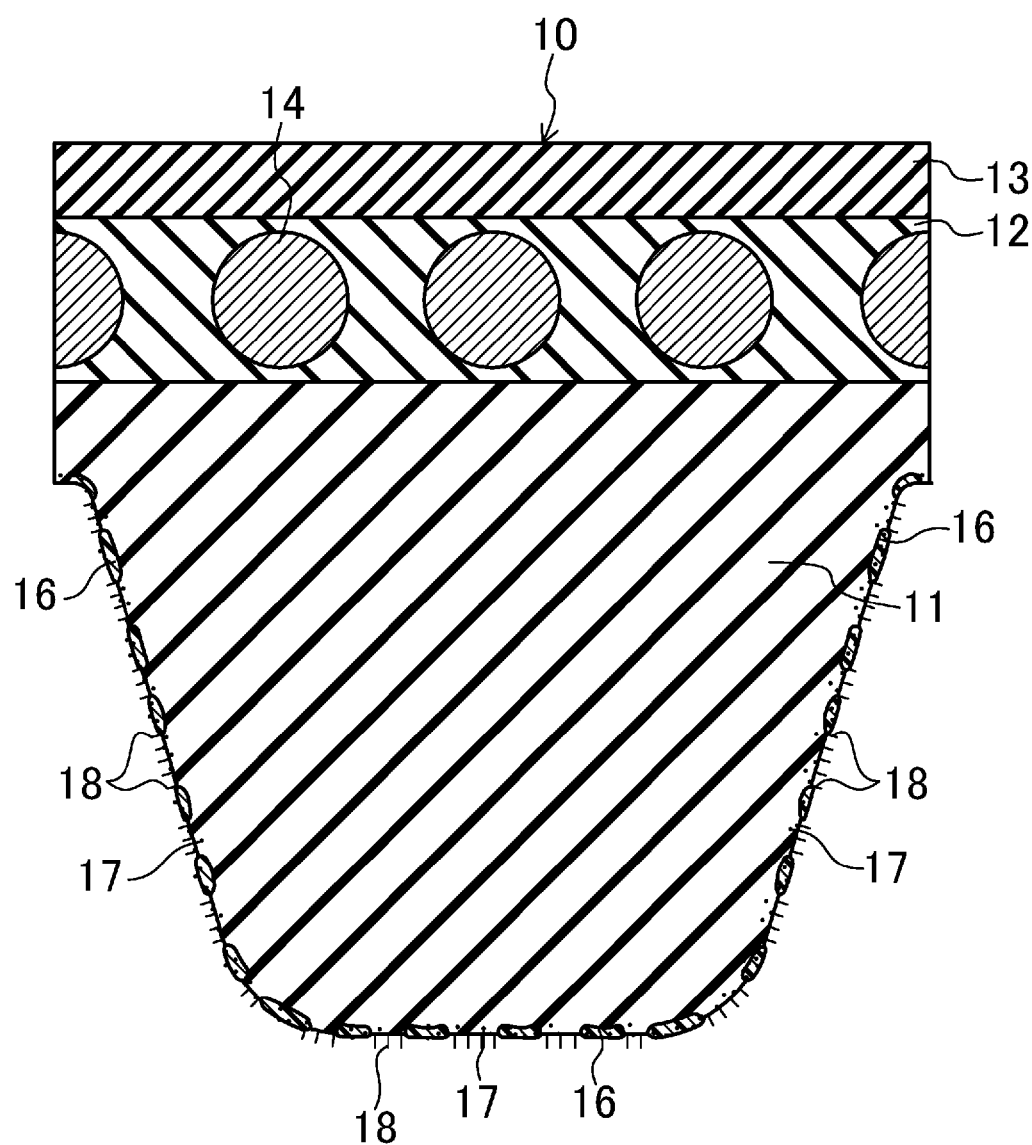
FIG. 2 is a cross-sectional view of a main part of the V-ribbed belt of the first embodiment.

FIGS. 1 and 2 illustrate a V-ribbed belt (friction transmission belt) B of a first embodiment. The V-ribbed belt B of the first embodiment is used for, e.g., a belt transmission system for driving an accessory(ies) in an engine room of an automobile. The V-ribbed belt B of the first embodiment has, e.g., a circumferential length of 700 to 3000 mm, a width of 10 to 36 mm, and a thickness of 4.0 to 5.0 mm.

The V-ribbed belt B of the first embodiment includes a V-ribbed belt body 10 having a trilaminar structure of a compression rubber layer 11 formed on an inner circumferential side of the V-ribbed belt B, an intermediate adhesion rubber layer 12, and a back rubber layer 13 formed on an outer circumferential side of the V-ribbed belt B. A cord 14 is embedded in the adhesion rubber layer 12 so as to form a helical pattern with pitch in a belt width direction.

In the compression rubber layer 11, a plurality of V-ribs 15 are formed so as to extend inward of the V-ribbed belt B. The V-ribs 15 are each formed as a protrusion extending in a belt length direction and having a substantially inverted triangular cross section, and are arranged in the belt width direction. Each V-rib 15 is formed such that a height is, e.g., 2.0 to 3.0 mm and that a width between base ends is, e.g., 1.0 to 3.6 mm. Moreover, the number of V-ribs 15 is, e.g., three to six (FIG. 1 illustrates six V-ribs 15). The compression rubber layer 11 is made of a rubber composition formed in such a manner that a rubber component and various compounding ingredients are mixed and kneaded to form a non-crosslinked rubber composition and that the non-crosslinked rubber composition is heated and pressurized and is cross-linked using a cross-linker.

Examples of the rubber component of the rubber composition forming the compression rubber layer 11 include ethylene-α-olefin elastomer (EPDM etc.), chloroprene rubber (CR), chlorosulfonated polyethylene rubber (CSM), and hydrogenated acrylonitrile rubber (H-NBR). The rubber component may be formed of a single type of material, or may be formed of a mixture of plural types of material.

Examples of the compounding ingredients include a reinforcer such as carbon black, a vulcanization accelerator, a cross-linker, an antioxidant, and a softener.

Examples of the carbon black as the reinforcer include channel black, furnace black such as SAF, ISAF, N-339, HAF, N-351, MAF, FEF, SRF, GPF, ECF, and N-234, thermal black such as FT and MT, and acetylene black. Another example of the reinforcer is silica. The reinforcer may be formed of a single type of material, or may be formed of a mixture of plural types of material. Considering a favorable balance between abrasion resistance and flex resistance, the mixing amount of the reinforcer with respect to 100 parts by mass of the rubber component is preferably 30 to 80parts by mass.

Examples of the vulcanization accelerator include metal oxide such as magnesium oxide and zinc oxide (zinc flower), metal carbonate, fatty acid such as stearic acid, and derivatives thereof. The vulcanization accelerator may be formed of a single type of material, or may be formed of a mixture of plural types of material. The mixing amount of the vulcanization accelerator with respect to 100 parts by mass of the rubber component is, e.g., 0.5 to 8 parts by mass.

Examples of the cross-linker include sulfur and organic peroxide. The cross-linker may be formed of one of sulfur or organic peroxide, or may be formed of both of sulfur and organic peroxide. In the case of sulfur, the mixing amount of the cross-linker with respect to 100 parts by mass of the rubber component is preferably 0.5 to 4.0 parts by mass. In the case of organic peroxide, the mixing amount of the cross-linker with respect to 100 parts by mass of the rubber component is, e.g., 0.5 to 8 parts by mass.

Examples of the antioxidant include amine-based antioxidants, quinoline-based antioxidants, hydroquinone derivatives, phenol-based antioxidants, and phosphite ester-based antioxidants. The antioxidant may be formed of a single type of material, or may be formed of a mixture of plural types of material. The mixing amount of the antioxidant with respect to 100 parts by mass of the rubber component is, e.g., 0 to 8 parts by mass.

Examples of the softener include petroleum-based softeners, mineral oil-based softeners such as paraffin wax, vegetable oil-based softeners such as castor oil, cottonseed oil, flaxseed oil, rapeseed oil, soybean oil, palm oil, coconut oil, peanut oil, Japan wax, rosin, and pine oil. The softener may be formed of a single type of material, or may be formed of a mixture of plural types of material. The mixing amount of the softener other than the petroleum-based softeners with respect to 100 parts by mass of the rubber component is, e.g., 2 to 30 parts by mass.

Note that, e.g., sheet silicate of a smectite group, a vermiculite group, or a kaolin group may be contained as the compounding ingredients.

The compression rubber layer 11 may be formed of a single type of rubber composition, or may be formed of a stack of plural types of rubber composition. For example, the compression rubber layer 11 may, referring to FIG. 3, include a pulley contact-side surface layer 11a containing a friction coefficient reduction material, and an inner rubber layer 11b stacked on the inner side of the pulley contact-side surface layer 11a. Examples of the friction coefficient reduction material include short fibers such as nylon short fibers, vinylon short fibers, aramid short fibers, polyester short fibers, and cotton short fibers, and ultrahigh molecular weight polyethylene resin. It is preferable that the inner rubber layer 11b contains no short fibers and no friction coefficient reduction material.

Figure 4:
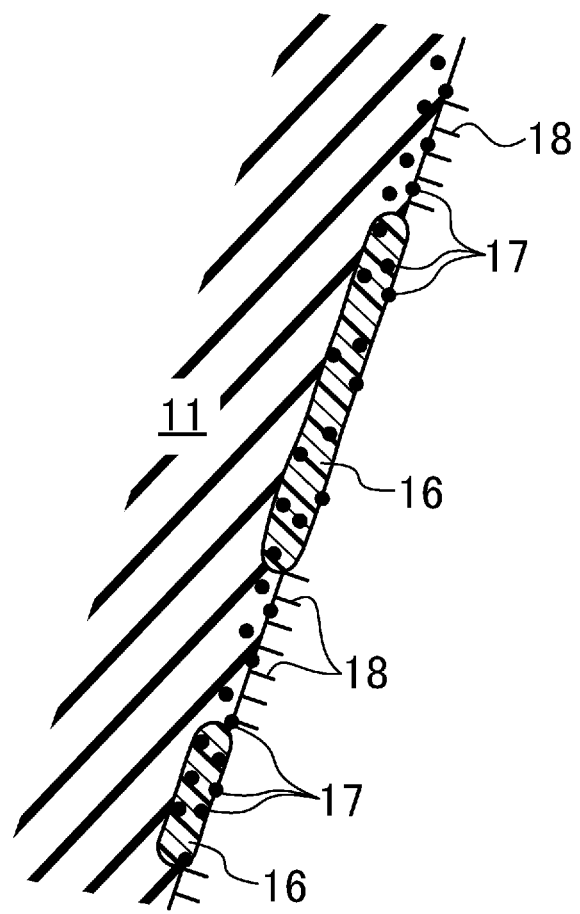
FIG. 4 is an enlarged cross-sectional view of the main part of the V-ribbed belt of the first embodiment.

Thermoplastic resin films 16 dispersively adhere to a surface of the V-rib 15 which is a pulley contact-side surface of the compression rubber layer 11. Referring to FIG. 4, each thermoplastic resin film 16 is formed so as to be physically in close contact with the surface of the V-rib 15. It is preferable that the thermoplastic resin films 16 are integrated with the V-rib 15 in the state in which each thermoplastic resin film 16 is exposed at the surface of the V-rib 15 and is partially or entirely embedded in the V-rib 15. The thermoplastic resin films 16 preferably have a thickness of 0.1 to 200 μm, and more preferably a thickness of 1.0 to 100 μm. Values for thickness of the thermoplastic resin film 16 measured using image processing of the cross section of the V-rib 15 are averaged, and such an average can be used as the thickness of the thermoplastic resin film 16. The coverage ratio of the surface of the V-rib 15 by the thermoplastic resin films 16 is preferably 10 to 90%, and more preferably 50 to 90%. Such a coverage ratio can be measured using image processing of the surface of the V-rib 15.

Examples of thermoplastic resin forming the thermoplastic resin films 16 include polyolefin resin such as polyethylene (PE) resin and polypropylene (PP) resin, polystyrene (PS) resin, polycarbonate (PC) resin, and acrylonitrile butadiene styrene (ABS) resin. Of these resins, polyolefin resin such as PE resin and PP resin is preferable. Considering thermal resistance, PP resin is preferable. The thermoplastic resin may be formed of a single type of material, or may be formed of a mixture of plural types of material. The thermoplastic resin forming the thermoplastic resin films 16 may be crystalline resin such as PE resin and PP resin, or may be non-crystalline resin such as PS resin. Considering the balance among molding processability and thermal resistance, the melting point of the thermoplastic resin forming the thermoplastic resin films 16 is preferably 100 to 170° C., and more preferably 130 to 160° C.

Friction coefficient reduction powder particles 17 dispersively adhere to the surface of the V-rib 15. Referring to FIG. 4, the friction coefficient reduction powder particles 17 are physically integrated with the surface of the V-rib 15. It is preferable that the friction coefficient reduction powder particles 17 are integrated with the V-rib 15 in the state in which each friction coefficient reduction powder particle 17 is exposed at the surface of the V-rib 15 and is partially or entirely embedded in the V-rib 15. There may be friction coefficient reduction powder particles 17 embedded in the surface layer of the V-rib 15. Moreover, it is preferable that some of the friction coefficient reduction powder particles 17 are physically integrated with a surface of the thermoplastic resin film 16. In this case, it is also preferable that the friction coefficient reduction powder particles 17 are integrated with the thermoplastic resin film 16 in the state in which each friction coefficient reduction powder particle 17 is exposed at the surface of the thermoplastic resin film 16 and is partially or entirely embedded in the thermoplastic resin film 16. Further, it is preferable that there are friction coefficient reduction powder particles 17 embedded in the thermoplastic resin film 16. The friction coefficient reduction powder particle 17 preferably has a particle size of 0.1 to 150 µm, and more preferably a particle size of 0.5 to 60 µm. The "particle size" refers to a value represented by any of the mesh size of a test sieve as measured by a sieving method, an equivalent Stokes diameter as measured by a sedimentation method, an equivalent spherical diameter as measured by a light scattering method, and an equivalent spherical diameter as measured by an electrical resistance test method. The area occupancy of the friction coefficient reduction powder particles 17 at the surface of the V-rib 15 is preferably 10 to 80%, and more preferably 20 to 60%. Such a adhered particle density can be measured using image processing of the surface of the V-rib 15.

Examples of the material forming the friction coefficient reduction powder particle 17 include fluorocarbon resin, sheet silicate, talc, calcium carbonate, and silica. Of these materials, fluorocarbon resin is preferable, considering reduction in friction coefficient of the V-rib 15 at the surface thereof. The friction coefficient reduction powder particle 17 may be formed of a single type of material, or may be formed of a mixture of plural types of material.

Examples of fluorocarbon resin include polytetrafluoroethylene (PTFE) resin, tetrafluoroethylene perfluoroalkylvinylether copolymer (PFA) resin, tetrafluoroethylene hexafluoropropylene copolymer (FEP) resin, tetrafluoroethylene ethylene copolymer (ETFE) resin, polyvinylidene fluoride (PVDF) resin, polychlorotrifluoroethylene (PCTFE) resin, and chlorotrifluoroethylene ethylene (ECTFE) resin. Of these materials, PTFE resin is preferable. Specifically, examples of PTFE resin include PTFE powder called "TFW Series" (TFW-500, TFW-1000, TFW-2000, TFW-3000, and TFW-3000F) manufactured by Seishin Enterprise Co., Ltd.

Examples of sheet silicate include smectite-group sheet silicate, vermiculite-group sheet silicate, and kaolin-group sheet silicate. Examples of smectite-group sheet silicate include montmorillonite, beidellite, saponite, and hectorite. Examples of vermiculite-group sheet silicate include trioctahedral vermiculite and dioctahedral vermiculite. Examples of kaolin-group sheet silicate include kaolinite, dickite, halloysite, lizardite, amesite, and chrysotile. Of these materials, montmorillonite of the smectite group is preferable.

According to the V-ribbed belt B of the first embodiment, the thermoplastic resin films 16 and the friction coefficient reduction powder particles 17 dispersively adhere, as described above, to the surfaces of the V-ribs 15 which are the pulley contact-side surfaces. Thus, even under a severe use condition such as the condition where great misalignment occurs among pulleys, the condition where the V-ribbed belt B is covered with a large amount of water, or the condition where extremely-large rotational fluctuation occurs, noise can be effectively reduced for a long period of time. Moreover, a friction coefficient reduction effect realized by the thermoplastic resin films 16 and the friction coefficient reduction powder particles 17 can reduce abrasion caused due to contact with the pulleys. Further, projections and depressions formed by the friction coefficient reduction powder particles 17 can reduce or prevent hydroplaning caused due to the presence of water (i.e., can drain off the V-ribbed belt B), thereby reducing or preventing slipping caused due to the presence of water. In addition, it can be expected for the thermoplastic resin films 16 to improve crack resistance.

Considering enhancement of abrasion resistance, many short fibers 18 may be provided at the surfaces of the V-ribs 15. It is preferable that the short fibers 18 are, at base ends thereof, positioned in the compression rubber layer 11 and protrude, at tip ends thereof, from spaces among the thermoplastic resin films 16 and the friction coefficient reduction powder particles 17.

Examples of the short fiber 18 include nylon short fibers, vinylon short fibers, aramid short fibers, polyester short fibers, and cotton short fibers. The short fibers 18 are manufactured in such a manner that long fibers are cut into a predetermined length while being delivered in a length direction thereof. For example, the adhesion treatment for dipping fibers in, e.g., a resorcin formalin latex aqueous solution (hereinafter referred to as an "RFL aqueous solution") and then heating the fibers may be applied to the short fibers 18. The short fiber 18 has, e.g., a length of 0.2 to 5.0 mm and a diameter of 10 to 50 µm.

The adhesion rubber layer 12 is formed in a strip shape so as to have a horizontally-oriented rectangular cross section, and has, e.g., a thickness of 1.0 to 2.5 mm. The back rubber layer 13 is also formed in a strip shape so as to have a horizontally-oriented rectangular cross section, and has, e.g., a thickness of 0.4 to 0.8 mm. Considering reduction in noise caused between the V-ribbed belt B and a flat pulley contacting the back surface of the V-ribbed belt B, the back rubber layer 13 is preferably formed such that a weave pattern of a woven fabric is transferred to a surface of the back rubber layer 13. The adhesion rubber layer 12 and the back rubber layer 13 are made of a rubber composition formed in such a manner that a rubber component and various compounding ingredients are mixed and kneaded to form a non-crosslinked rubber composition and that the non-crosslinked rubber composition is heated and pressurized and is cross-linked using the cross-linker. Considering reduction in adhesiveness caused due to contact between the V-ribbed belt B and the flat pulley contacting the back surface of the V-ribbed belt B, the back rubber layer 13 is preferably made of a rubber composition slightly harder than the adhesion rubber layer 12. The configuration may be employed, in which the compression rubber layer 11 and the adhesion rubber layer 12 form the V-ribbed belt body 10, and a reinforcement fabric such as a woven fabric, a knitted fabric, or a non-woven fabric formed of, e.g., yarns of cotton, polyamide fibers, polyester fibers, or aramid fibers is provided instead of the back rubber layer 13.

Examples of the rubber component of the rubber composition forming the adhesion rubber layer 12 and the back rubber layer 13 include ethylene-α-olefin elastomer (EPDM etc.), chloroprene rubber (CR), chlorosulfonated polyethylene rubber (CSM), and hydrogenated acrylonitrile rubber (H-NBR). The rubber components of the adhesion rubber layer 12 and the back rubber layer 13 are preferably the same as that of the compression rubber layer 11.

As in the compression rubber layer 11, examples of the compounding ingredients include a reinforcer such as carbon black, a vulcanization accelerator, a cross-linker, an antioxidant, and a softener.

The compression rubber layer 11, the adhesion rubber layer 12, and the back rubber layer 13 may be made of different rubber compositions, or may be made of the same rubber composition.

The cord 14 is formed of twisted yarns of, e.g., polyester (PET) fibers, polyethylene naphthalate (PEN) fibers, aramid fibers, or vinylon fibers. For adhesiveness of the cord 14 to the V-ribbed belt body 10, the adhesion treatment for dipping the cord 14 in an RFL aqueous solution and then heating the cord 14 and/or the adhesion treatment for dipping the cord 14 in rubber cement and then drying the cord 14 are applied to the cord 14 prior to molding.

Figure 5:
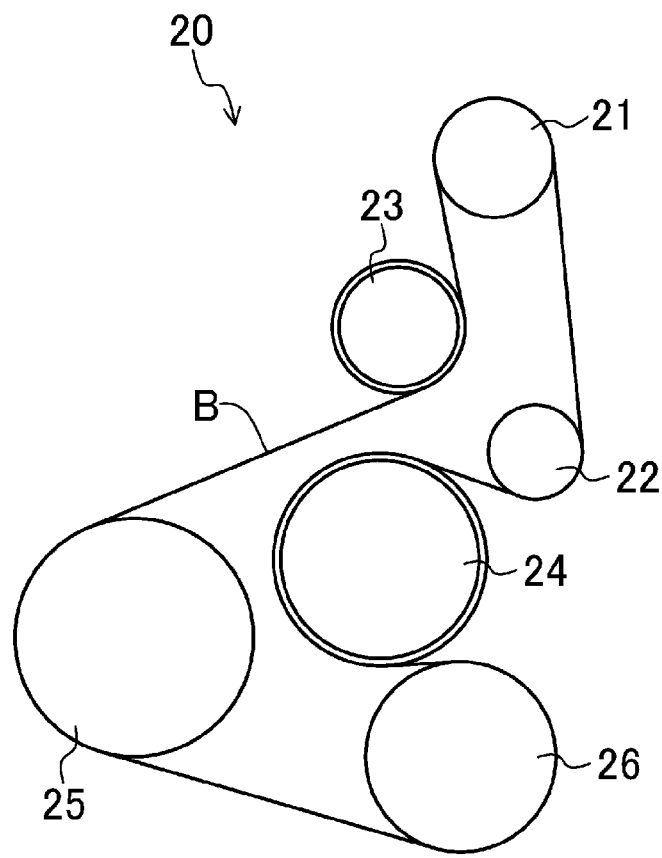
FIG. 5 is a view illustrating the layout of pulleys in an accessory drive belt transmission system for automobile using the V-ribbed belt of the first embodiment.

FIG. 5 illustrates the layout of pulleys in an accessory drive belt transmission system 20 for automobile using the V-ribbed belt B of the first embodiment. The accessory drive belt transmission system 20 is a serpentine drive type system in which the V-ribbed belt B is wrapped around six pulleys, i.e., four ribbed pulleys and two flat pulleys, to transmit power.

The accessory drive belt transmission system 20 includes a power steering pulley 21 positioned on the uppermost side, an AC generator pulley 22 disposed on a substantially lower right side of the power steering pulley 21, a tensioner pulley 23 which is a flat pulley disposed on a lower left side of the power steering pulley 21 and an upper left side of the AC generator pulley 22, a water pump pulley 24 which is a flat pulley disposed right below the tensioner pulley 23 on a lower left side of the AC generator pulley 22, a crank shaft pulley 25 disposed on a lower left side of the tensioner pulley 23 and a lower left side of the water pump pulley 24, and an air-conditioner pulley 26 disposed on a lower right side of the water pump pulley 24 and a lower right side of the crank shaft pulley 25. Of there pulleys, the pulleys other than the tensioner pulley 23 and the water pump pulley 24 which are the flat pulleys are ribbed pulleys. These ribbed pulleys and flat pulleys are formed of, e.g., a pressed metal product, a casted product, or a resin molded product made of nylon resin, phenol resin, etc., and each have a diameter of φ50 to 150 mm.

In the accessory drive belt transmission system 20, the V-ribbed belt B is wrapped around the power steering pulley 21 such that a V-rib-side surface of the V-ribbed belt B contacts the power steering pulley 21. Then, after the V-ribbed belt B is wrapped around the tensioner pulley 23 such that the back surface of the V-ribbed belt B contacts the tensioner pulley 23, the V-ribbed belt B is wrapped around the crank shaft pulley 25 and the air-conditioner pulley 26 in this order such that the V-rib-side surface of the V-ribbed belt B contacts the crank shaft pulley 25 and the air-conditioner pulley 26. Subsequently, the V-ribbed belt B is wrapped around the water pump pulley 24 such that the back surface of the V-ribbed belt B contacts the water pump pulley 24. Then, the V-ribbed belt B is wrapped around the AC generator pulley 22 such that the V-rib-side surface of the V-ribbed belt B contacts the AC generator pulley 22, followed by returning to the power steering pulley 21.

According to the V-ribbed belt B of the first embodiment, the thermoplastic resin films 16 and the friction coefficient reduction powder particles 17 dispersively adhere, as described above, to the surfaces of the V-ribs 15 which are the pulley contact-side surfaces. Thus, even under a severe use condition such as the condition where great misalignment of 0.5 to 1.0° (more severely, misalignment of 1.0 to 2.0°) occurs among the pulleys due to a short belt span length, which is the length of part of the V-ribbed belt B between adjacent ones of the pulleys, of 40 to 100 mm, the condition where there is a possibility that the V-ribbed belt B is covered with a large amount of water in, e.g., the engine room of the automobile, or the condition where an extremely-large rotational fluctuation ratio is 30 to 50% (more severely, 50 to 80%), noise can be effectively reduced for a long period of time. Moreover, the friction coefficient reduction effect realized by the thermoplastic resin films 16 and the friction coefficient reduction powder particles 17 can reduce abrasion caused due to contact with the pulleys. Further, the projections and the depressions formed by the friction coefficient reduction powder particles 17 can reduce or prevent hydroplaning caused due to the presence of water (i.e., can drain off the V-ribbed belt B), thereby reducing or preventing slipping caused due to the presence of water. In addition, it can be expected for the thermoplastic resin films 16 to improve crack resistance.

Next, one example of the method for manufacturing the V-ribbed belt B of the first embodiment will be described with reference to FIGS. 6-11.

Figure 6:
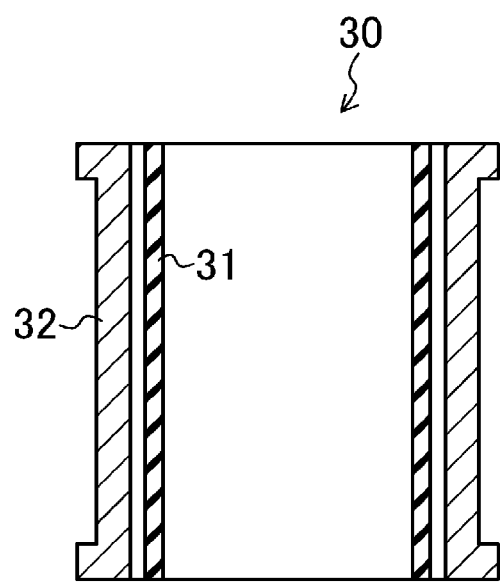
FIG. 6 is a longitudinal sectional view of a belt mold assembly used for manufacturing the V-ribbed belt of the first embodiment.
Figure 7:
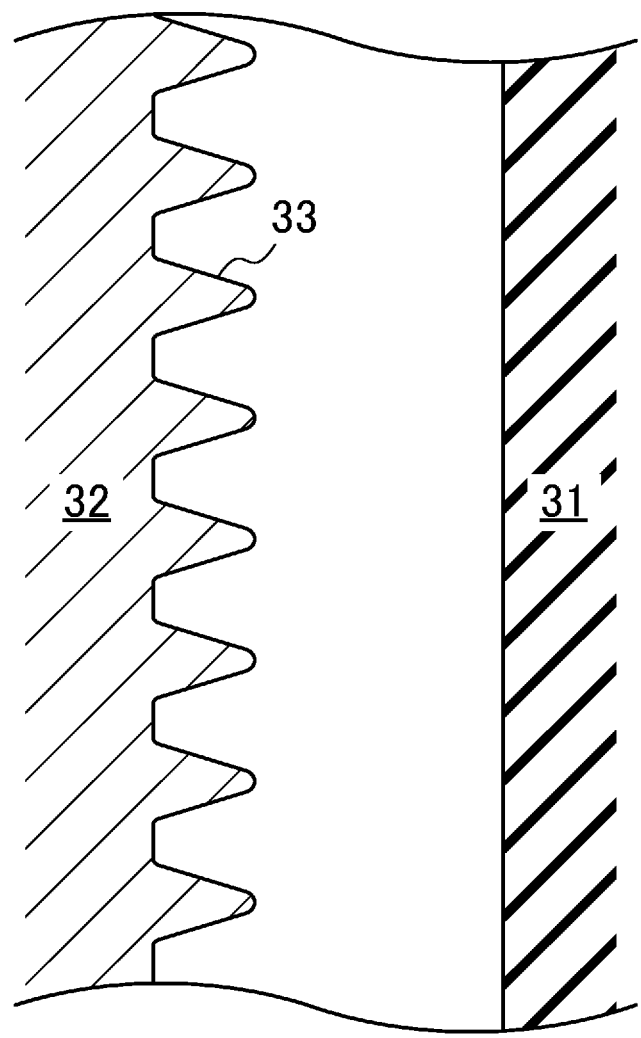
FIG. 7 is an enlarged longitudinal sectional view of part of the belt mold assembly used for manufacturing the V-ribbed belt of the first embodiment.

Referring to FIGS. 6 and 7, a belt mold assembly 30 including a cylindrical inner mold (rubber sleeve) 31 and a cylindrical outer mold 32 and formed such that the inner mold 31 and the outer mold 32 are arranged concentric with each other is used in manufacturing of the V-ribbed belt B of the first embodiment.

In the belt mold assembly 30, the inner mold 31 is made of a flexible material such as rubber. An outer circumferential surface of the inner mold 31 forms a molding surface, and, e.g., a weave pattern of a woven fabric is formed at an outer circumferential surface of the inner mold 31. The outer mold 32 is made of a rigid material such as metal. An inner circumferential surface of the outer mold 32 forms a molding surface, and grooves 33 for forming the V-ribs 15 are formed at regular intervals in an axial direction at an inner circumferential surface of the outer mold 32. In the outer mold 32, a temperature control mechanism configured to circulate a heat medium such as water vapor or a cooling medium such as water to control a temperature. In the belt mold assembly 30, a pressurizing unit configured to pressurize and expand the inner mold 31 from the inside.

In manufacturing of the V-ribbed belt B of the first embodiment, a rubber component is first mixed and kneaded with compounding ingredients using a mixer such as a kneader or a Banbury mixer. The resultant non-crosslinked rubber composition is formed into a sheet by, e.g., calendering, thereby forming a non-crosslinked rubber sheet 11' for compression rubber layer 11 (i.e., a non-crosslinked rubber composition for belt formation). Similarly, a non-crosslinked rubber sheet 12' for adhesion rubber layer 12 and a non-crosslinked rubber sheet 13' for back rubber layer 13 are formed. After the adhesion treatment for dipping twisted yarns 14' to be a cord 14 in an RFL aqueous solution and then heating the twisted yarns 14', the adhesion treatment for dipping the twisted yarns 14' in rubber cement and then heating and drying the twisted yarns 14' is performed.

Figure 8:
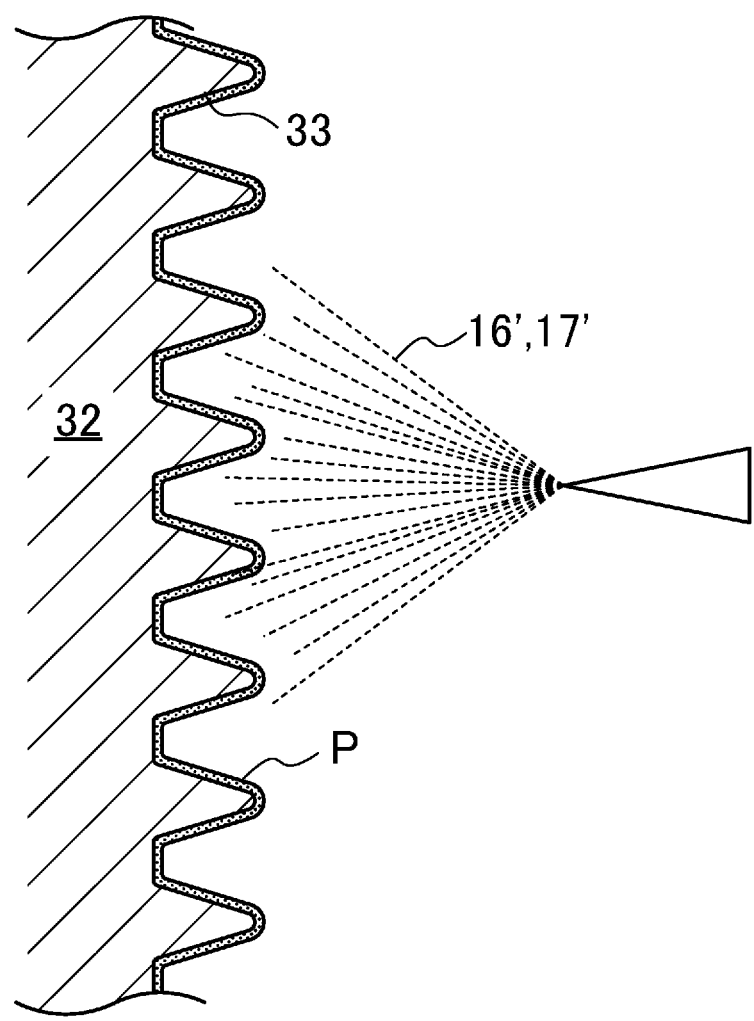
FIG. 8 is a view illustrating the step of spraying power particles to an outer mold in manufacturing of the V-ribbed belt of the first embodiment.

Next, referring to FIG. 8, thermoplastic resin powder particles 16' for forming thermoplastic resin films 16 and friction coefficient reduction powder particles 17' are sprayed onto the inner circumferential surface, i.e., the molding surface for forming a pulley contact-side part, of the outer mold 32. At this point, a powder layer P is formed on the molding surface of the outer mold 32. Note that the thermoplastic resin powder particles 16' and the friction coefficient reduction powder particles 17' can be sprayed using typical powder coating equipment.

Specifically, examples of the thermoplastic resin powder particle 16' include particles of olefin powder manufactured by Seishin Enterprise Co., Ltd. (a product named "PPW-5" (polypropylene resin powder) and a product named "SK-PE-20L" (low-density polyethylene resin powder)). The thermoplastic resin powder particles 16' may contain, e.g., particles of composite powder formed in such a manner that fluorocarbon resin powder is covered with thermoplastic resin. Specifically, examples of the composite powder include composite powder manufactured by Seishin Enterprise Co., Ltd. The particle size of the thermoplastic resin powder particle 16' is preferably equal to or smaller than that of the friction coefficient reduction powder particle 17'. The particle size of the thermoplastic resin powder particle 16' is preferably 1.0 to 100 μm, and more preferably 5.0 to 50 μm. As in the friction coefficient reduction powder particle 17, the "particle size" refers to a value represented by any of the mesh size of a test sieve as measured by a sieving method, an equivalent Stokes diameter as measured by a sedimentation method, an equivalent spherical diameter as measured by a light scattering method, and an equivalent spherical diameter as measured by an electrical resistance test method.

It is preferable that the thermoplastic resin powder particles 16' and the friction coefficient reduction powder particles 17' are simultaneously sprayed. In such a case, the thermoplastic resin powder particles 16' and the friction coefficient reduction powder particles 17' may be sprayed using different devices, or a mixture of the thermoplastic resin powder particles 16' and the friction coefficient reduction powder particles 17' may be sprayed using a single device. Note that the friction coefficient reduction powder particles 17' may be sprayed after the thermoplastic resin powder particles 16' are sprayed, or the thermoplastic resin powder particles 16' may be sprayed after the friction coefficient reduction powder particles 17' are sprayed.

The mass of the sprayed thermoplastic resin powder particles 16' per unit area in formation of the powder layer P is preferably 5 to 50 g/m$^2$, and more preferably 10 to 30 g/m$^2$. The mass of the sprayed friction coefficient reduction powder particles 17' per unit area is preferably 30 to 200 g/m$^2$, and more preferably 50 to 150 g/m$^2$. The mass of the sprayed friction coefficient reduction powder particles 17' per unit area is preferably greater than the mass of the sprayed thermoplastic resin powder particles 16' per unit area. Specifically, the ratio of the mass of the sprayed friction coefficient reduction powder particles 17' per unit area to the mass of the sprayed thermoplastic resin powder particles 16' per unit area (i.e., the mass of the sprayed friction coefficient reduction powder particles 17'/the mass of the sprayed thermoplastic resin powder particles 16') is preferably 100/80 to 100/5, and more preferably 100/50 to 100/10. Considering enhancement of adhesion to the outer mold 32, when the powder layer P is formed, the thermoplastic resin powder particles 16' to be sprayed and/or the friction coefficient reduction powder particles 17' to be sprayed are preferably charged with, e.g., a voltage of 10 to 100 kV. The thickness of the powder layer P is preferably 0.1 to 200 μm, and more preferably 1.0 to 100 μm.

Figure 3:
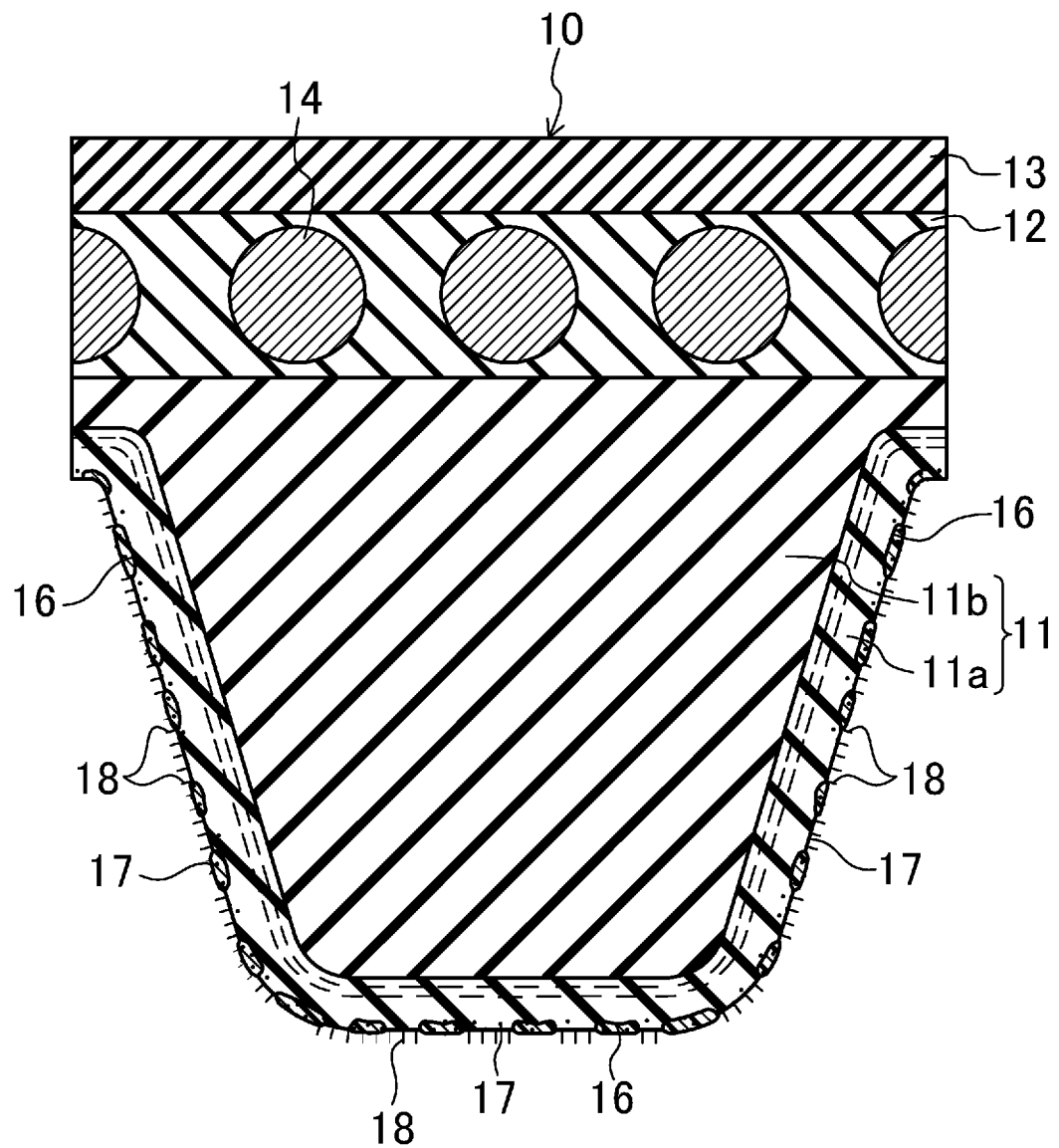
FIG. 3 is a cross-sectional view of a main part of a variation of the V-ribbed belt of the first embodiment.
Figure 9:
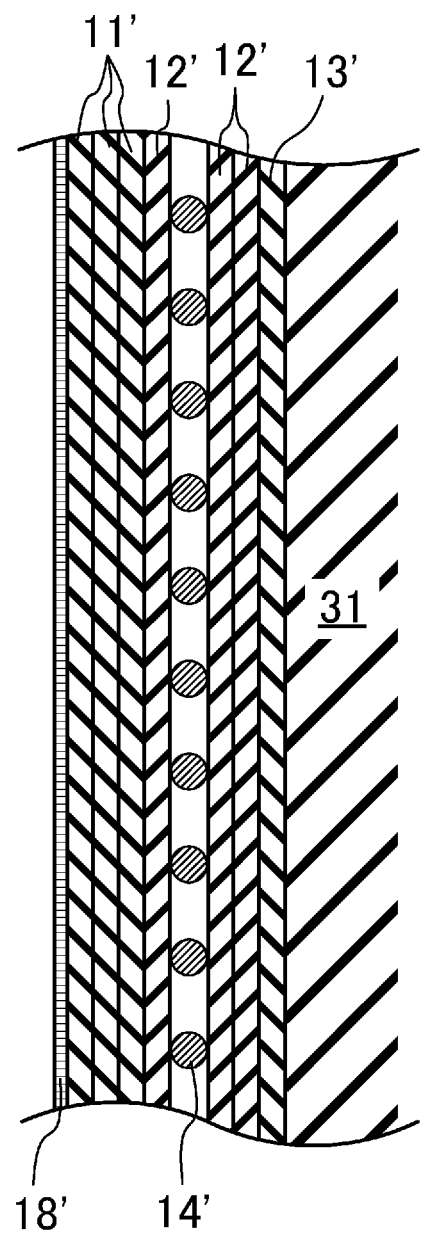
FIG. 9 is a view illustrating the step of stacking non-crosslinked rubber sheets and twisted yarns on an inner mold in manufacturing of the V-ribbed belt of the first embodiment.

On the other hand, referring to FIG. 9, the non-crosslinked rubber sheet 13' for back rubber layer 13 and the non-crosslinked rubber sheet 12' for adhesion rubber layer 12 are winded and stacked on the outer circumferential surface, i.e., the molding surface, of the inner mold 31 in this order. Then, the twisted yarns 14' for cord 14 are further spirally winded around the cylindrical inner mold 31 on which the non-crosslinked rubber sheets 12', 13' are stacked. Subsequently, the non-crosslinked rubber sheet 12' for adhesion rubber layer 12 and the non-crosslinked rubber sheet 11' for compression rubber layer 11 are further winded and stacked on the twisted yarns 14' in this order. Note that, in the case where the V-ribbed belt B having the configuration illustrated in FIG. 3 is manufactured, rubber compositions different between a composition for pulley contact-side surface layer 11a and a composition for inner rubber layer 11b may be used for the non-crosslinked rubber sheet 11' for compression rubber layer 11.

In the case where the short fibers 18 are exposed at the surfaces of the V-ribs 15, e.g., an organic solvent of toluene or an adhesive is applied to an outer circumferential surface of the outermost non-crosslinked rubber sheet 11' for outermost compression rubber layer 11, and then the short fibers 18 are sprayed the outermost non-crosslinked rubber sheet 11' to form a layer 18' of the short fibers 18. The layer 18' of the short fibers 18 preferably has a thickness of 10 to 300 μm, and more preferably a thickness of 50 to 200 μm.

Figure 10:
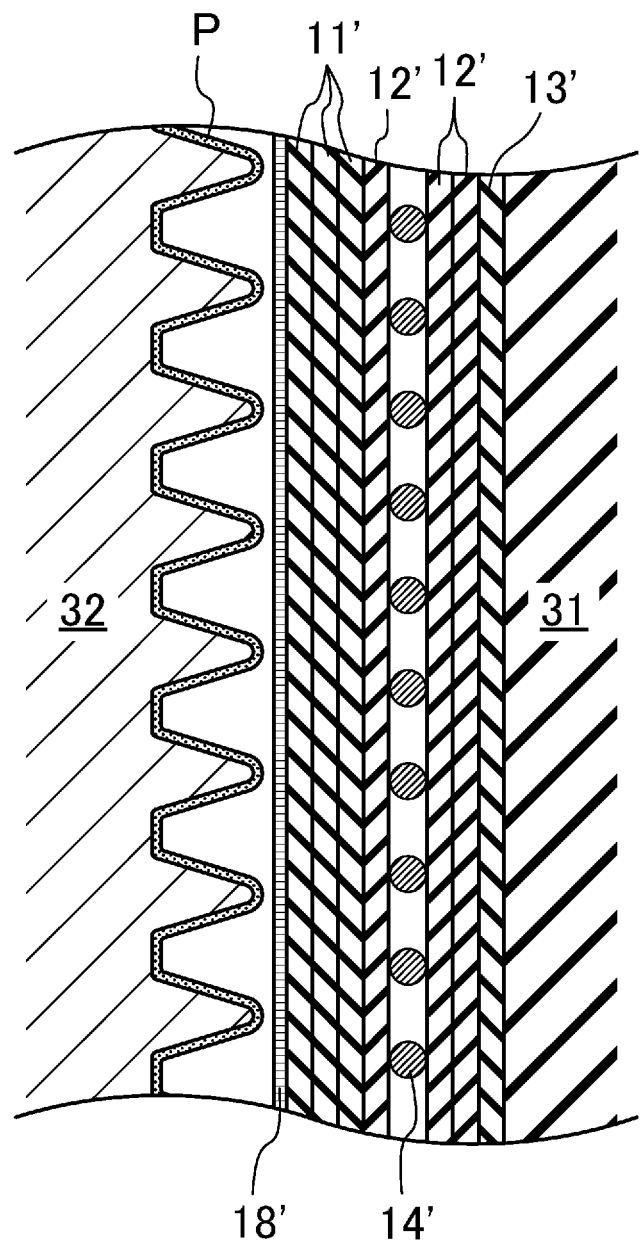
FIG. 10 is a view illustrating the step of placing the inner mold in the outer mold in manufacturing of the V-ribbed belt of the first embodiment.
Figure 11:
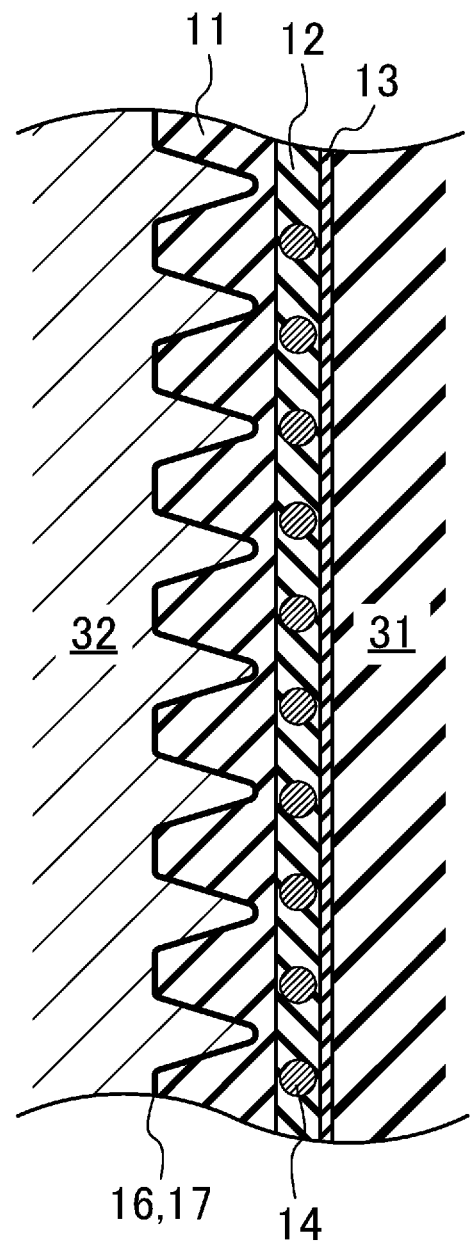
FIG. 11 is a view illustrating the step of molding a belt slab in manufacturing of the V-ribbed belt of the first embodiment.

Next, referring to FIG. 10, the inner mold 31 is disposed inside the outer mold 32, and then is hermetically sealed. In such a state, an inner space of the inner mold 31 is in a hermetically-sealed state.

Subsequently, the outer mold 32 is heated to such a molding temperature that the thermoplastic resin powder particles 16' are melted and that the friction coefficient reduction powder particles 17' are not melted, and, e.g., high-pressure air is introduced into the hermetically-sealed inner space of the inner mold 31 to pressurize the inner mold 31. In such a state, referring to FIG. 11, the inner mold 31 expands to compress the non-crosslinked rubber sheets 11', 12', 13' for belt formation against the molding surface of the outer mold 32. Meanwhile, crosslinking of the non-crosslinked rubber sheets 11', 12', 13' proceeds such that the non-crosslinked rubber sheets 11', 12', 13' are integrated together and are combined with the twisted yarns 14'. Eventually, a cylindrical belt slab is molded. In the powder layer P formed in such a manner that the thermoplastic resin powder particles 16' and the friction coefficient reduction powder particles 17' are sprayed to the molding surface of the outer mold 32 in advance, every plural number of the thermoplastic resin powder particles 16' are melted and integrated together to form a thermoplastic resin film 16, and the thermoplastic resin films 16 dispersively adhere to an outer circumferential surface of the belt slab. Moreover, friction coefficient reduction powder particles 17 dispersively adhere to the outer circumferential surface of the belt slab. Further, the friction coefficient reduction powder particles 17 adhere to surfaces of the thermoplastic resin films 16, and are embedded in the thermoplastic resin films 16. The temperature for molding the belt slab is, e.g., 100 to 180° C., the pressure for molding the belt slab is, e.g., 0.5 to 2.0 MPa, and the time for molding the belt slab is, e.g., 10 to 60 minutes.

The inner pressure of the inner mold 31 is reduced so that the inner mold 31 is released from the hermetically-sealed state. The belt slab molded between the inner mold 31 and the outer mold 32 is removed. The belt slab is cut into rings each having a predetermined width, and each ring-shaped belt slab is turned inside out. As a result, V-ribbed belts B are manufactured.

(Second Embodiment)

Figure 12:
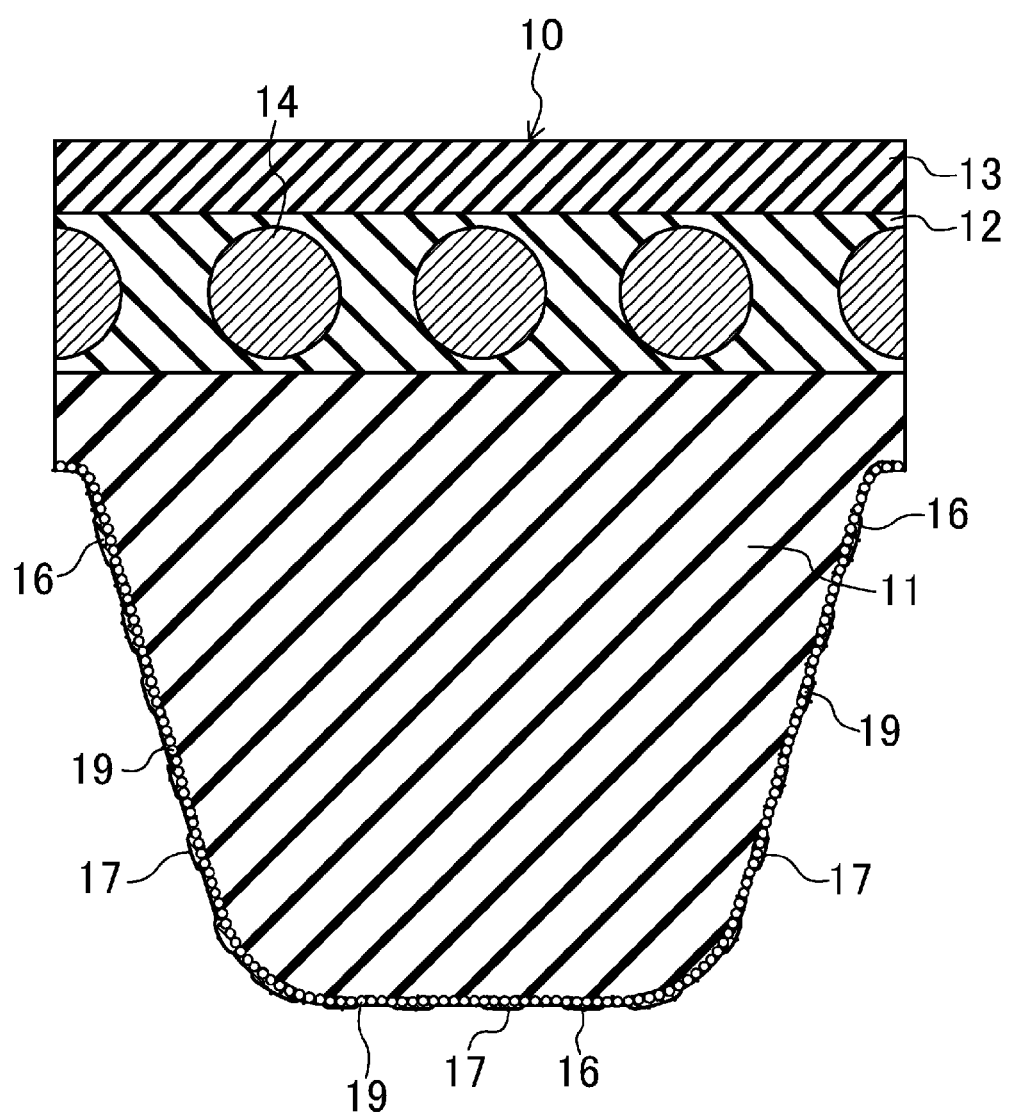
FIG. 12 is a cross-sectional view of a main part of a V-ribbed belt of a second embodiment.
Figure 13:
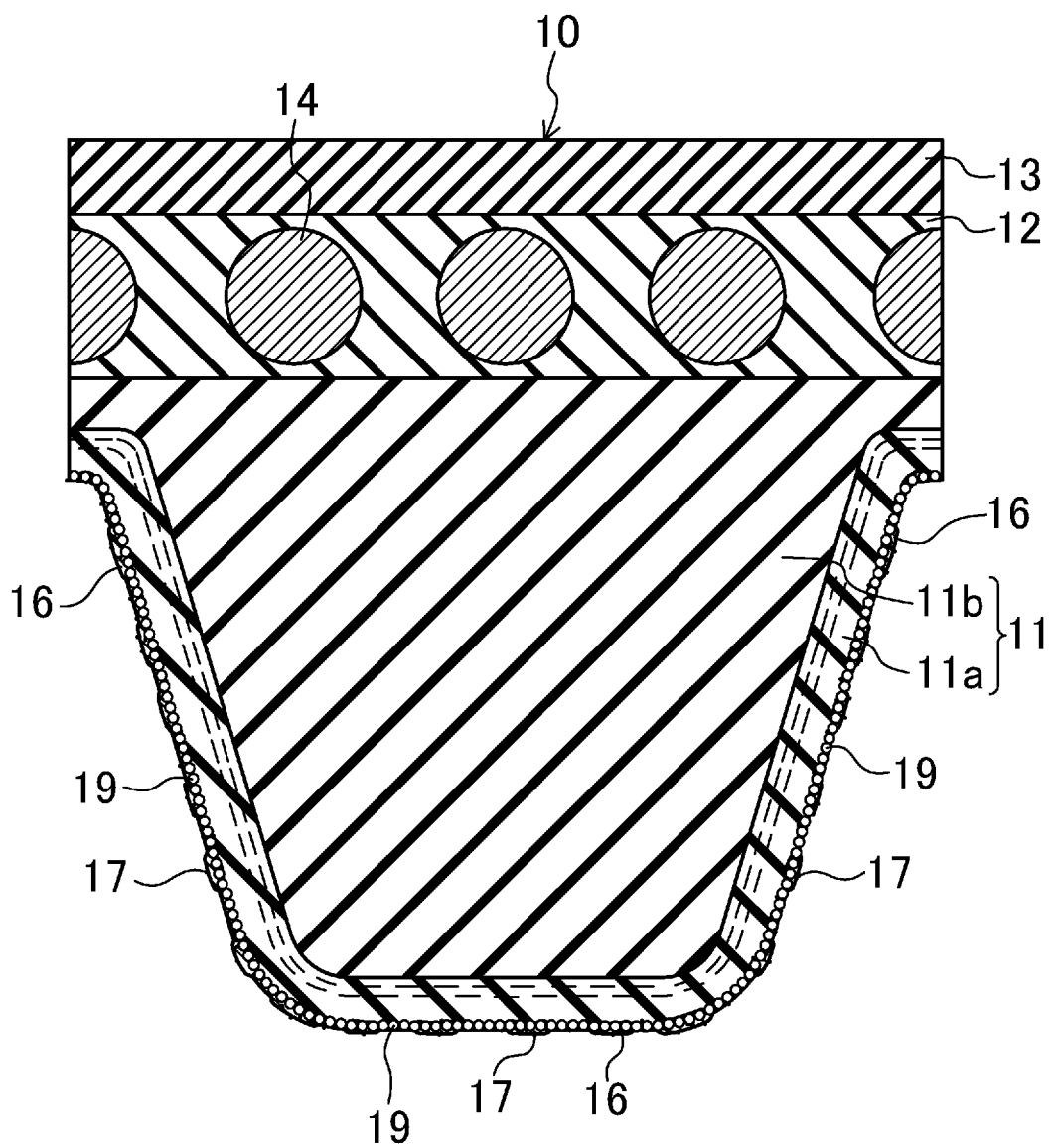
FIG. 13 is a cross-sectional view of a main part of a variation of the V-ribbed belt of the second embodiment.

FIGS. 12 and 13 illustrate a V-ribbed belt (friction transmission belt) B of a second embodiment. FIG. 12 illustrates the case where a compression rubber layer 11 is formed of a single layer, and FIG. 13 illustrates the case where a compression rubber layer 11 is formed of a pulley contact-side surface layer 11a and an inner rubber layer 11b positioned inside the pulley contact-side surface layer 11a. Note that the same reference numerals as those shown in the first embodiment are used to represent equivalent elements of the second embodiment. The V-ribbed belt B of the second embodiment is also used for, e.g., a belt transmission system for driving an accessory(ies) in an engine room of an automobile.

In the V-ribbed belt B of the second embodiment, a surface of each V-rib 15 which is a pulley contact-side surface of the compression rubber layer 11 in a V-ribbed belt body 10 is covered with a cloth 19, and thermoplastic resin films 16 and friction coefficient reduction powder particles 17 dispersively adhere to the cloth 19.

The cloth 19 is, e.g., a woven fabric, a knitted fabric, or a non-woven fabric. It is preferable that the cloth 19 is seamless and is formed in a cylindrical shape. Since the cloth 19 is shaped along the V-rib 15, the cloth 19 preferably has stretchability considering molding processability. In the view of the foregoing, the cloth 19 is preferably a knitted fabric formed by, e.g., flat knitting, ribbing, or purling. The treatment for adhesion to the V-ribbed belt body 10 or adhesion to the thermoplastic resin films 16 and the friction coefficient reduction powder particles 17 is preferably applied to the cloth 19. The treatment for dipping the cloth 19 in an RFL aqueous solution and then heating the cloth 19 is preferable as the foregoing adhesion treatment. Other examples of the adhesion treatment include the treatment for dipping the cloth 19 in a silane coupling solution and then drying the cloth 19, the treatment for dipping the cloth 19 in an epoxy solution or an isocyanate solution and then heating the cloth 19, the treatment for dipping the cloth 19 in rubber cement and then drying the cloth 19, and a combination thereof. Meshes of the cloth 19 to which the adhesion treatment is applied are preferably filled with an adhesive. The thickness of the cloth 19 is, e.g., 0.1 to 1.0 mm.

Examples of a fibrous material forming the cloth 19 include synthetic fibers such as polyethylene fibers, polypropylene fibers, polyester fibers, nylon fibers, aramid fibers, and PBO fibers and natural fibers such as cotton and hemp.

Figure 14:
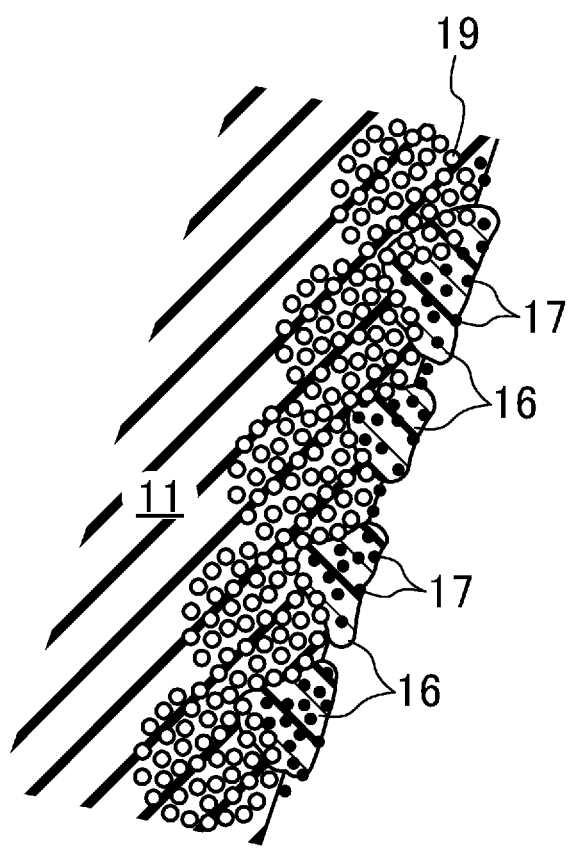
FIG. 14 is an enlarged cross-sectional view of the main part of the V-ribbed belt of the second embodiment.

The thermoplastic resin films 16 are preferably melted and adhere to the cloth 19 provided on the surfaces of the V-ribs 15. Referring to FIG. 14, it is more preferable that the thermoplastic resin films 16 are melted and adhere to the cloth 19 in the state in which spaces formed among the threads forming the cloth 19 and corresponding to projections and depressions at a surface of the cloth 19 are filled with the thermoplastic resin films 16 and in which spaces among V-rib-side filaments of each thread forming the cloth 19 are impregnated with the material forming the thermoplastic resin films 16. Referring to FIG. 14, it is preferable that the friction coefficient reduction powder particles 17 are integrated with the cloth 19 or the rubber layer filling the meshes of the cloth 19 in the state in which each friction coefficient reduction powder particle 17 is exposed at the cloth 19 provided on the surface of the V-rib 15 and is partially or entirely embedded in the cloth 19 or the rubber layer filling the meshes of the cloth 19. There may be friction coefficient reduction powder particles 17 embedded in the rubber layer filling the meshes of the cloth 19. Moreover, it is preferable that some of the friction coefficient reduction powder particles 17 are physically integrated with a surface of the thermoplastic resin film 16. In such a case, it is preferable that the friction coefficient reduction powder particles 17 are integrated with the thermoplastic resin film 16 in the state in which each friction coefficient reduction powder particle 17 is exposed at the surface of the thermoplastic resin film 16 and is partially or entirely embedded in the thermoplastic resin film 16. Further, it is preferable that there are friction coefficient reduction powder particles 17 embedded in the thermoplastic resin film 16.

Next, one example of the method for manufacturing the V-ribbed belt B of the second embodiment will be described.

Figure 15:
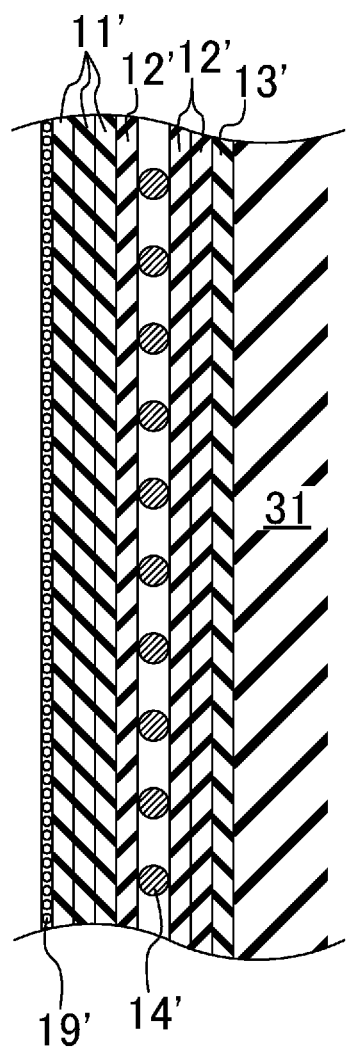
FIG. 15 is a view illustrating the step of stacking non-crosslinked rubber sheets etc. on an inner mold in manufacturing of the V-ribbed belt of the second embodiment.

In manufacturing of the V-ribbed belt B of the second embodiment, a non-crosslinked rubber sheet 13' for back rubber layer 13 and a non-crosslinked rubber sheet 12' for adhesion rubber layer 12 are, referring to FIG. 15, winded and stacked on an outer circumferential surface, i.e., a molding surface, of an inner mold 31, and then twisted yarns 14' for cord 14 are spirally winded around the cylindrical inner mold 31 on which the non-crosslinked rubber sheets 12', 13' are stacked. Subsequently, a non-crosslinked rubber sheet 12' for adhesion rubber layer 12 and a non-crosslinked rubber sheet 11' for compression rubber layer 11 are winded and stacked on the twisted yarns 14' in this order. Then, the non-crosslinked rubber sheet 11' is covered with a cloth material 19'. In such a case, the configuration is realized in molding, in which the surfaces of the V-ribs 15 are covered with the cloth 19 and the thermoplastic resin films 16 and the friction coefficient reduction powder particles 17 adhere to the cloth 19.

Other configurations, manufacturing steps, features and advantages are the same as those of the first embodiment.

(Other Embodiments)

In the first and second embodiments, the thermoplastic resin powder particles 16' and the friction coefficient reduction powder particles 17' are sprayed to the molding surface of the outer mold 32 to form the powder layer P. However, the present disclosure is not limited to such a configuration. The thermoplastic resin powder particles 16' and/or the friction coefficient reduction powder particles 17' may be sprayed to an outer circumferential surface of a stack of rubber layers provided on the outer circumferential surface, i.e., the molding surface, of the inner mold 31 to form the powder layer P.

Figure 16:
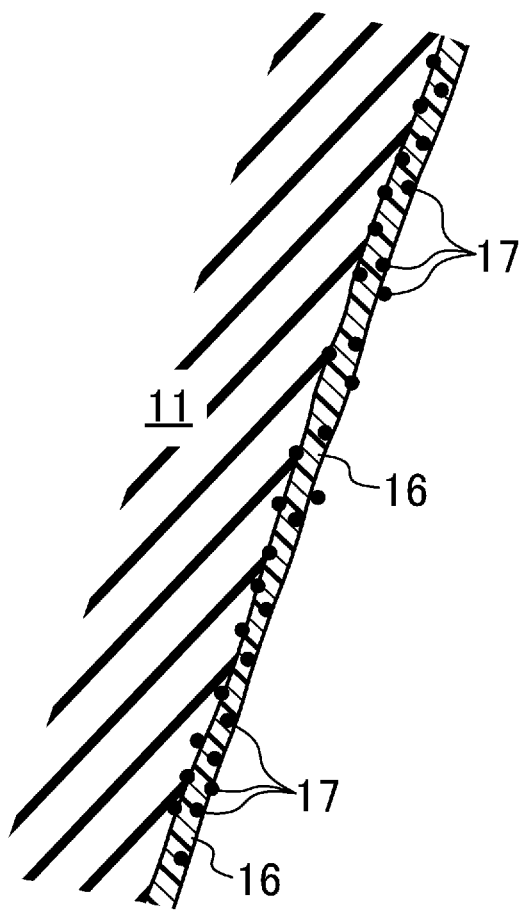
FIG. 16 is an enlarged cross-sectional view of a main part of another variation of the V-ribbed belt of the first embodiment.
Figure 17:
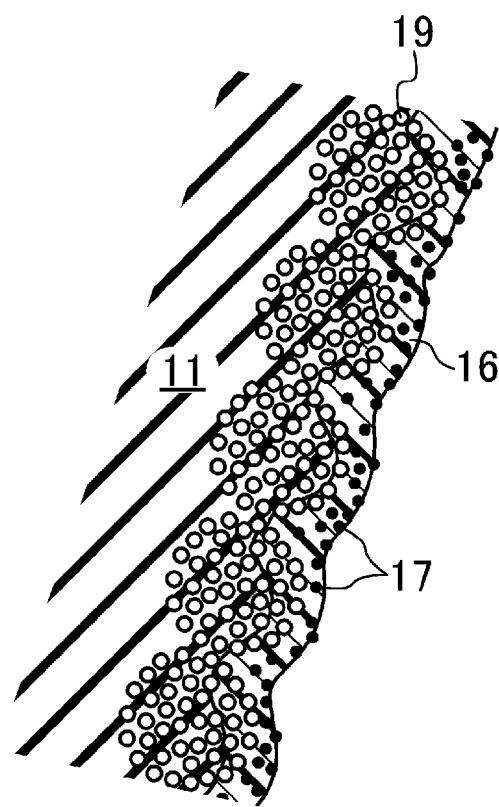
FIG. 17 is an enlarged cross-sectional view of a main part of another variation of the V-ribbed belt of the second embodiment.

In the first and second embodiments, the thermoplastic resin films 16 dispersively adhere to the surfaces of the V-ribs 15, but the present disclosure is not limited to such a configuration. As in a variation of the first embodiment illustrated in FIG. 16 and a variation of the second embodiment illustrated in FIG. 17, the thermoplastic resin film 16 may adhere to the surface of the V-rib 15 so as to cover the surface of the V-rib 15. Note that these configurations can be realized in such a manner that the amount of thermoplastic resin powder particles 16' to be sprayed to the inner circumferential surface, i.e., the molding surface, of the outer mold 32 is increased.

In the first and second embodiments, the V-ribbed belt B has been described as the friction transmission belt, but the present disclosure is not limited to the V-ribbed belt B. The friction transmission belt may be, e.g., a low-edge V-belt.

In the first and second embodiments, the accessory drive belt transmission system 20 for automobile has been described as the belt transmission system, but the present disclosure is not limited to the accessory drive belt transmission system 20. The belt transmission system may be, e.g., a belt transmission system for general industry.

EXAMPLES (V-Ribbed Belt)

Example 1

Non-crosslinked rubber sheets for compression rubber layer, adhesion rubber layer, and back rubber layer each containing an EPDM composition and twisted yarns for cord were prepared.

Specifically, the non-crosslinked rubber sheet for pulley contact-side surface layer of the compression rubber layer contains EPDM ("Nordel IP4640" manufactured by The Dow Chemical Company, containing an ethylene content of 55% by mass, a propylene content of 40% by mass, and an ethylidene norbornene (ENB) content of 5.0% by mass, and having a Mooney viscosity of 40 $ML_{1+4}$ (at a temperature of 125° C.)) as a rubber component. The followings were mixed with 100 parts by mass of the rubber component: 50 parts by mass of carbon black ("Showblack IP-200" manufactured by Showa Cabot K. K.), 8 parts by mass of paraffin oil ("SunFlex 2280" manufactured by Japan Sun Oil Company Ltd.), 1.6 parts by mass of a vulcanizing agent ("Oil Sulfur" manufactured by Hosoi Chemical Industry Co., Ltd.), 2.8 parts by mass of a vulcanization accelerator ("EP-150" (a mixture of vulcanization accelerators DM (dibenzothiazyl disulfide), TT (tetramethylthiuramdisulfide), and EZ (zinc diethyldithiocarbamate)) manufactured by Ouchi Shinko Chemical Industrial Co., Ltd.), 1.2 parts by mass of a vulcanization accelerator ("MSA" (N-oxydiethylene-2-benzothiazolylsulfenamide) manufactured by Ouchi Shinko Chemical Industrial Co., Ltd.), 1 part by mass of a vulcanization assistant (stearic acid manufactured by Kao Corporation), 5 parts by mass of a vulcanization assistant (zinc oxide manufactured by Sakai Chemical Industry Co., Ltd.), 2 parts by mass of an antioxidant ("224" (TMDQ: 2,2,4-trimethyl-1,2-dihydroquinoline) manufactured by Ouchi Shinko Chemical Industrial Co., Ltd.), 1 part by mass of an antioxidant ("MB" (2-mercaptobenzimidazole) manufactured by Ouchi Shinko Chemical Industrial Co., Ltd.), and 40 parts by mass of ultrahigh molecular weight polyethylene ("Hi-Zex Million 240S" manufactured by Mitsui Chemicals, Inc.). The foregoing mixture was kneaded using a Banburry mixer. Then, the resultant was rolled using calender rolls.

The non-crosslinked rubber sheet for inner rubber layer of the compression rubber layer contains EPDM ("Nordel IP4640" manufactured by The Dow Chemical Company) as a rubber component. The followings were mixed with 100 parts by mass of the rubber component: 70 parts by mass of carbon black ("Showblack IP-200" manufactured by Showa Cabot K. K.), 8 parts by mass of paraffin oil ("SunFlex 2280" manufactured by Japan Sun Oil Company Ltd.), 1.6 parts by mass of a vulcanizing agent ("Oil Sulfur" manufactured by Hosoi Chemical Industry Co., Ltd.), 2.8 parts by mass of a vulcanization accelerator ("EP-150" manufactured by Ouchi Shinko Chemical Industrial Co., Ltd.), 1.2 parts by mass of a vulcanization accelerator ("MSA" manufactured by Ouchi Shinko Chemical Industrial Co., Ltd.), 1 part by mass of a vulcanization assistant (stearic acid manufactured by Kao Corporation), 5 parts by mass of a vulcanization assistant (zinc oxide manufactured by Sakai Chemical Industry Co., Ltd.), 2 parts by mass of an antioxidant ("224" manufactured by Ouchi Shinko Chemical Industrial Co., Ltd.), and 1 part by mass of an antioxidant ("MB" manufactured by Ouchi Shinko Chemical Industrial Co., Ltd.). The foregoing mixture was kneaded using the Banburry mixer. Then, the resultant was rolled using the calender rolls.

The non-crosslinked rubber sheet for adhesion rubber layer contains EPDM ("Nordel IP4640" manufactured by The Dow Chemical Company) as a rubber component. The followings were mixed with 100 parts by mass of the rubber component: 50 parts by mass of carbon black ("HAF Carbon" manufactured by Mitsubishi Chemical Corporation), 20 parts by mass of silica ("Tokusil GU" manufactured by Tokuyama Corporation), 20 parts by mass of paraffin oil ("SunFlex 2280" manufactured by Japan Sun Oil Company LTD.), 3 parts by mass of a vulcanizing agent ("Oil Sulfur" manufactured by Hosoi Chemical Industry Co., Ltd.), 2.5 parts by mass of a vulcanization accelerator ("EP-150" manufactured by Ouchi Shinko Chemical Industrial Co., Ltd.), 1 part by mass of a vulcanization assistant (stearic acid manufactured by Kao Corporation), 5 parts by mass of a vulcanization assistant (zinc oxide manufactured by Sakai Chemical Industry Co., Ltd.), 2 parts by mass of an antioxidant ("224" manufactured by Ouchi Shinko Chemical Industrial Co., Ltd.), 1 part by mass of an antioxidant ("MB" manufactured by Ouchi Shinko Chemical Industrial Co., Ltd.), 5 parts by mass of a tackifier ("Petroleum Resin Quintone A-100" manufactured by Zeon Corporation), and 2 parts by mass of short fibers (cotton powder). The foregoing mixture was kneaded using the Banburry mixer. Then, the resultant was rolled using the calender rolls.

The non-crosslinked rubber sheet for back rubber layer contains EPDM ("Nordel IP4640" manufactured by The Dow Chemical Company) as a rubber component. The followings were mixed with 100 parts by mass of the rubber component: 60 parts by mass of carbon black ("HAF Carbon" manufactured by Mitsubishi Chemical Corporation), 8 parts by mass of paraffin oil ("SunFlex 2280" manufactured by Japan Sun Oil Company LTD.), 1.6 parts by mass of a vulcanizing agent ("Oil Sulfur" manufactured by Hosoi Chemical Industry Co., Ltd.), 2.8 parts by mass of a vulcanization accelerator ("EP-150" manufactured by Ouchi Shinko Chemical Industrial Co., Ltd.), 1.2 parts by mass of a vulcanization accelerator ("MSA" manufactured by Ouchi Shinko Chemical Industrial Co., Ltd.), 1 part by mass of a vulcanization assistant (stearic acid manufactured by Kao Corporation), 5 parts by mass of a vulcanization assistant (zinc oxide manufactured by Sakai Chemical Industry Co., Ltd.), 2 parts by mass of an antioxidant ("224" manufactured by Ouchi Shinko Chemical Industrial Co., Ltd.), 1 part by mass of an antioxidant ("MB" manufactured by Ouchi Shinko Chemical Industrial Co., Ltd.), and 13 parts by mass of short fibers ("Nylon 66, Type T-5" manufactured by Asahi Kasei Corporation). The foregoing mixture was kneaded using the Banburry mixer. Then, the resultant was rolled using the calender rolls.

The twisted yarns for cord was formed of polyester fibers manufactured by Teijin Ltd. with a fineness of 1100 dtex/2×3 (the number of twists of a second twisted yarn is 9.5 T/10 cm (Z) and the number of twists of a first twisted yarn is 2.19 T/10 cm). The following treatments were sequentially applied to the twisted yarns: the treatment for dipping the twisted yarns in a toluene solution containing 20% by mass (solid content) of isocyanate and then heating and drying the twisted yarns at 240° C. for 40 seconds; the treatment for dipping the twisted yarns in an RFL aqueous solution and then heating and drying the twisted yarns at 200° C. for 80 seconds; and the treatment for dipping the twisted yarns in rubber cement in which a rubber composition for adhesion rubber layer is dissolved in toluene and then heating and drying the twisted yarns at 60° C. for 40 seconds.

The RFL aqueous solution was prepared as follows. Resorcinol, formalin (37% by mass), and sodium hydroxide were mixed with water, and the resultant was stirred. Then, water was further added to the resultant. While being stirred, the resultant was matured for five hours, thereby preparing an RF aqueous solution with the ratio of the number of moles of resorcinol (R) to the number of moles of formalin (F) being 0.5. Then, 40% by mass (solid content) of chlorosulfonated polyethylene rubber (CSM) latex (L) was added to the RF aqueous solution such that the solid mass ratio of RF to L is 0.25, and water was further added such that the solid content is 20% by mass. While being stirred, the resultant was matured for 12 hours, thereby preparing the RFL aqueous solution.

A rubber sleeve was placed on a cylindrical drum having a smooth surface, and the non-crosslinked rubber sheet for back rubber layer and the non-crosslinked rubber sheet for adhesion rubber layer were winded around the rubber sleeve in this order. Then, the twisted yarns to which the adhesion treatments have applied were spirally winded around the non-crosslinked rubber sheet. Moreover, the non-crosslinked rubber sheet for adhesion rubber layer, the non-crosslinked rubber sheet for inner rubber layer of the compression rubber layer, and the non-crosslinked rubber sheet for pulley contact-side surface layer of the compression rubber layer were winded around the twisted yarns in this order, thereby forming a stack of the rubber layers on the rubber sleeve. After toluene was applied to an outer circumferential surface of the stack of the rubber layers, nylon short fibers ("Rhodia SD" manufactured by Rhodia and having a length of 0.6 mm) were sprayed to form a layer of the short fibers.

On the other hand, polypropylene (PP) resin powder ("PPW-5" manufactured by Seishin Enterprise Co., Ltd. and having a particle size of 5 µm) charged with 100 kV and polytetrafluoroethylene (PTFE) resin powder ("KTL-10N" manufactured by Kitamura Ltd. and having a particle size of 10 µm) charged with 100 kV were mixed together in a ratio of 100/43. The resultant was sprayed to an inner circumferential surface of an outer mold to form a powder layer. Then, the foregoing stack of the rubber layers was inserted into the outer mold, and an inner mold is hermetically sealed with the inner mold being surrounded by the outer mold.

Then, the outer mold was heated, and the hermetically-sealed space inside the inner mold was pressurized to vulcanize and mold a belt slab. A molding temperature was 170° C., a molding pressure was 1.0 MPa, and a molding time was 30 minutes.

A V-ribbed belt manufactured from the belt slab was used as Example 1. In the V-ribbed belt of Example 1, the PP films and the PTFE powder particles dispersively adhered to V-rib surfaces. The PP films were integrated with V-ribs in the state in which each PP film is exposed at the V-rib surface and is partially or entirely embedded in the V-rib. The PTFE powder particles were also integrated with the V-ribs in the state in which each PTFE powder particle is exposed at the V-rib surface and is partially or entirely embedded in the V-rib. Moreover, some of the PTFE powder particles adhered onto the PP films. The PTFE powder particles were integrated with the PP films in the state in which each PTFE powder particle is exposed at a PP film surface and is partially or entirely embedded in the PP film. Further, there were PTFE powder particles embedded in the PP films.

The V-ribbed belt of Example 1 had a circumferential length of 1115 mm, a thickness of 4.3 mm, and a V-rib height of 2.0 mm, and the number of V-ribs were six (the width of the V-ribbed belt was 21.36 mm).

Comparative Example 1-1

A V-ribbed belt was manufactured in a similar manner to that of Example 1, except that only PTFE powder particles were sprayed to an inner circumferential surface of an outer mold to form a powder layer, and was used as Comparative Example 1-1. In the V-ribbed belt of Comparative Example 1-1, the PTFE powder particles dispersively adhered to V-rib surfaces. The PTFE powder particles were integrated with V-ribs in the state in which each PTFE powder particle is exposed at the V-rib surface and is partially or entirely embedded in the V-rib.

Comparative Example 1-2

A V-ribbed belt was manufactured in a similar manner to that of Example 1, except that only PP powder particles was sprayed to an inner circumferential surface of an outer mold to form a powder layer, and was used as Comparative Example 1-2. In the V-ribbed belt of Comparative Example 1-2, PP films dispersively adhered to V-rib surfaces. The PP films were integrated with V-ribs in the state in which each PP film is exposed at the V-rib surface and is partially or entirely embedded in the V-rib.

Example 2

The same non-crosliked rubber sheets for compression rubber layer, adhesion rubber layer, and back rubber layer and the same twisted yarns for cord as those of Example 1 were prepared. In addition, a cloth for covering V-rib surfaces was prepared.

The cloth was a knitted fabric (having a configuration of R22/78-52) formed by flat knitting and formed of nylon 6 fibers. The treatment for dipping the cloth in an RFL aqueous solution and then heating and drying the cloth at 150° C. for two minutes was applied to the cloth.

The RFL aqueous solution was prepared as follows. Resorcinol, formalin (37% by mass), and sodium hydroxide were mixed with water, and the resultant was stirred. Then, water was further added to the resultant. While being stirred, the resultant was matured for two hours, thereby preparing an RF aqueous solution with the ratio of the number of moles of resorcinol (R) to the number of moles of formalin (F) being 1/0.6. Then, 40.5% by mass (solid content) of vinylpyridine (Vp) SBR latex (L) ("NIPOL2518FS" manufactured by Zeon Corporation) was added to the RF aqueous solution such that the solid mass ratio of RF to L is 1/6, and water was further added such that the solid content is 9% by mass. While being stirred, the resultant was matured for 12 hours, thereby preparing the RFL aqueous solution.

A rubber sleeve was placed on a cylindrical drum having a smooth surface, and the non-crosslinked rubber sheet for back rubber layer and the non-crosslinked rubber sheet for adhesion rubber layer were winded around the rubber sleeve in this order. Then, the twisted yarns to which the adhesion treatments have applied were spirally winded around the non-crosslinked rubber sheet. Moreover, the non-crosslinked rubber sheet for adhesion rubber layer, the non-crosslinked rubber sheet for inner rubber layer of the compression rubber layer, and the non-crosslinked rubber sheet for pulley contact-side surface layer of the compression rubber layer were winded around the twisted yarns in this order, thereby forming a stack of the rubber layers on the rubber sleeve. Then, the cloth was winded around an outer circumferential surface of the stack of the rubber layers.

On the other hand, polyethylene (PE) resin powder ("MI-PELON" manufactured by Mitsui Chemicals Inc. and having a particle size of 10 µm) charged with 100 kV and PTFE powder ("KTL-10N" manufactured by Kitamura Ltd. and having a particle size of 10 µm) charged with 100 kV were mixed together in a ratio of 100/43. The resultant was sprayed to an inner circumferential surface of an outer mold to form a powder layer. Then, the foregoing stack of the rubber layers was inserted into the outer mold, and an inner mold is hermetically sealed with the inner mold being surrounded by the outer mold.

Then, the outer mold was heated, and the hermetically-sealed space inside the inner mold was pressurized to vulcanize and mold a belt slab. A molding temperature was 170° C., a molding pressure was 1.0 MPa, and a molding time was 30 minutes.

A V-ribbed belt manufactured from the belt slab was used as Example 2. In the V-ribbed belt of Example 2, the V-rib surfaces were covered by the knitted fabric, and the PE films and the PTFE powder particles dispersively adhered to the knitted fabric. The PE films were melted and adhered to the knitted fabric provided on the V-rib surfaces so as to cover the fibers forming the knitted fabric. The PTFE powder particles were integrated with the cloth in the state in which each PTFE powder particle is exposed at the cloth provided on the V-rib surface and is partially or entirely embedded in the cloth. Moreover, some of the PTFE powder particles adhered to the PE films. The PTFE powder particles were integrated with the PE films in the state in which each PTFE powder particle is exposed at a PE film surface and is partially or entirely embedded in the PE film. Further, there were PTFE powder particles embedded in the PE films.

The V-ribbed belt of Example 2 had a circumferential length of 1115 mm, a thickness of 4.3 mm, and a V-rib height of 2.0 mm, and the number of V-ribs were six (the width of the V-ribbed belt was 21.36 mm).

Comparative Example 2-1

A V-ribbed belt was manufactured in a similar manner to that of Example 2, except that no powder particles were sprayed to an inner circumferential surface of an outer mold, and was used as Comparative Example 2-1. In the V-ribbed belt of Comparative Example 2-1, V-rib surfaces were covered by a knitted fabric.

Comparative Example 2-2

A V-ribbed belt was manufactured in a similar manner to that of Example 2, except that only PE powder particles were sprayed to an inner circumferential surface of an outer mold to form a powder layer, and was used as Comparative Example 2-2. In the V-ribbed belt of Comparative Example 2-2, V-rib surfaces were covered by a knitted fabric, and the PE powder particles dispersively adhered to the knitted fabric.

Comparative Example 2-3

A V-ribbed belt was manufactured in a similar manner to that of Example 2, except that only PTFE powder particles were sprayed to an inner circumferential surface of an outer mold to form a powder layer, and was used as Comparative Example 2-3. In the V-ribbed belt of Comparative Example 2-3, V-rib surfaces were covered by a knitted fabric, and the PTFE powder particles dispersively adhered to the knitted fabric.

(Test and Evaluation Methods)

Figure 18:
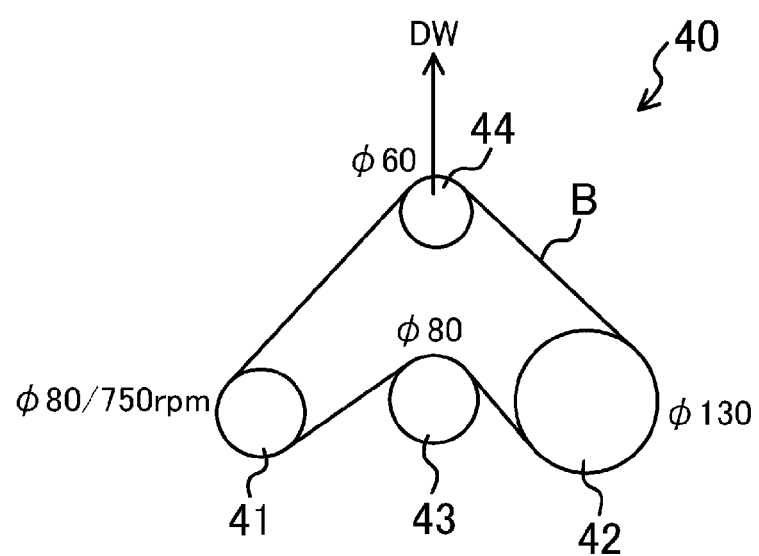
FIG. 18 is a view illustrating the layout of pulleys in a belt running tester for testing noise while a belt is running

FIG. 18 illustrates the layout of pulleys in a belt running tester 40 for testing noise while a belt is running.

In the belt running tester 40, a drive pulley 41 which is a ribbed pulley having a diameter of 80 mm is provided on a lower left side, and a first driven pulley 42 which is a ribbed pulley having a diameter of 130 mm and made of phenol resin is provided on a right side of the drive pulley 41. Moreover, a second driven pulley 43 which is a flat pulley having a diameter of 80 mm is provided between the drive pulley 41 and the first driven pulley 42, and a third driven pulley 44 which is a ribbed pulley having a diameter of 60 mm is provided above the second driven pulley 43. In the belt running tester 40, a V-ribbed belt B is wrapped such that a V-rib-side surface of the V-ribbed belt B contacts the drive pulley 41, the first driven pulley 42, and the third driven pulley 44 which are the ribbed pulleys and that a back surface of the V-ribbed belt B contacts the second driven pulley 43 which is the flat pulley. Note that the third driven pulley 44 is vertically movable such that belt tension is applied to the V-ribbed belt B. There is a misalignment of 3° between the first driven pulley 42 and the second driven pulley 43.

Each of the V-ribbed belts of Example 1, Comparative Examples 1-1 and 1-2, Example 2, and Comparative Examples 2-1, 2-2, and 2-3 was placed on the belt running tester 40. A dead weight of 380 N was upwardly applied to the third driven pulley 44 such that belt tension is applied to the V-ribbed belt, and the first driven pulley 42 rotated, under an atmospheric temperature of 5° C., with a rotational speed of 750 rpm to run the V-ribbed belt. A belt running time until particular noise is generated was measured, and was regarded as a "noise generation belt running time." Note that the test was terminated in 200 hours at a maximum.

(Test and Evaluation Results)

Example 1 and Comparative Examples 1-1 and 1-2

For the V-ribbed belt of Example 1, the noise generation belt running time was 200 hours, meaning that no noise was generated. For the V-ribbed belt of Comparative Example 1-1, the noise generation belt running time was 20 hours. For the V-ribbed belt of Comparative Example 1-2, the noise generation belt running time was one hour.

In the V-ribbed belt of Example 1, the PP films and the PTFE powder particles remained even after belt running of 200 hours. On the other hand, when noise was generated after the lapse of 20 hours from the start of belt running, almost all of the PTFE powder particles were dropped from the V-ribbed belt of Comparative Example 1-1. Noise was generated from the V-ribbed belt of Comparative Example 1-2 after the lapse of one hour from the start of belt running, and no PP films were dropped even though the V-ribbed belt of the Comparative Example 1-2 was kept running until it reaches 20 hours.

Example 2 and Comparative Examples 2-1, 2-2, and 2-3

For the V-ribbed belt of Example 2, the noise generation belt running time was 200 hours, meaning that no noise was generated. For the V-ribbed belts of Comparative Examples 2-1 and 2-2, the noise generation belt running time was 0 hour, meaning that noise was generated right after the V-ribbed belt started running. For the V-ribbed belt of Comparative Example 2-3, the noise generation belt running time was 150 hours.

In the V-ribbed belt of Example 2, many of the PTFE powder particles remained and adhered to the PE films melted and adhering to the knitted fabric even after belt running of 200 hours. On the other hand, when noise was generated after belt running of 150 hours, almost all of the PTFE powder particles were dropped from the V-ribbed belt of Comparative Example 2-3.

The present disclosure is useful for the friction transmission belt and the method for manufacturing the friction transmission belt.

The embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A friction transmission belt comprising:
   a belt body made of a rubber composition and wrapped around pulleys to transmit power,
   wherein thermoplastic resin films dispersively adhere to a pulley contact-side surface of the belt body, and friction coefficient reduction powder particles dispersively adhere to the pulley contact-side surface of the belt body.

2. The friction transmission belt of claim 1, wherein the pulley contact-side surface of the belt body is covered with a cloth, and the thermoplastic resin films and the friction coefficient reduction powder particles adhere to the cloth.

3. The friction transmission belt of claim 2, wherein the thermoplastic resin films are melted and adhere to the cloth.

4. The friction transmission belt of claim 2, wherein the cloth is a knitted fabric.

5. The friction transmission belt of claim 1, wherein some of the friction coefficient reduction powder particles adhere to surfaces of the thermoplastic resin films.

6. The friction transmission belt of claim 1, wherein friction coefficient reduction powder particles are embedded in the thermoplastic resin films.

7. The friction transmission belt of claim 1, wherein the thermoplastic resin films is made of polyolefin resin.

8. The friction transmission belt of claim 1, wherein the friction coefficient reduction powder particles are made of fluorocarbon resin.

9. The friction transmission belt of claim 1, wherein the belt body is a V-ribbed belt body.

10. A friction transmission belt comprising:
    a belt body made of a rubber composition and wrapped around pulleys to transmit power,
    wherein the friction transmission belt is manufactured by spraying, in advance, thermoplastic resin powder particles and friction coefficient reduction powder particles to a molding surface of a belt mold assembly for forming a pulley contact-side part of the friction transmission belt to form a powder layer, and
    compressing a non-crosslinked rubber composition for belt formation against the powder layer to crosslink the non-crosslinked rubber composition at a molding temperature at which the thermoplastic resin powder particles are melted and at which the friction coefficient reduction powder particles are unmelted.

11. A method for manufacturing a friction transmission belt including a belt body made of a rubber composition and wrapped around pulleys to transmit power, the method comprising:
    spraying, in advance, thermoplastic resin powder particles and friction coefficient reduction powder particles to a molding surface of a belt mold assembly for forming a pulley contact-side part of the friction transmission belt to form a powder layer, and compressing a non-crosslinked rubber composition for belt formation against the powder layer to crosslink the non-crosslinked rubber composition at a molding temperature at which the thermoplastic resin powder particles are melted and at which the friction coefficient reduction powder particles are unmelted.

12. The method of claim 11, wherein the thermoplastic resin powder particles and the friction coefficient reduction powder particles are simultaneously sprayed to the molding surface of the belt mold assembly.

13. The method of claim 11, wherein a particle size of the thermoplastic resin powder particles is equal to or smaller than a particle size of the friction coefficient reduction powder particles.

14. The method of claim 11, wherein a mass of the friction coefficient reduction powder particles sprayed to the molding surface of the belt mold assembly per unit area is greater than a mass of the thermoplastic resin powder particles sprayed to the molding surface of the belt mold assembly per unit area.

15. The method of claim 14, wherein a ratio of the mass of the friction coefficient reduction powder particles sprayed to the molding surface of the belt mold assembly per unit area to the mass of the thermoplastic resin powder particles sprayed to the molding surface of the belt mold assembly per unit area is 100/80 to 100/5.

* * * * *